US008043485B2

(12) United States Patent
Davidson

(10) Patent No.: US 8,043,485 B2
(45) Date of Patent: *Oct. 25, 2011

(54) MULTI-PULSE PROTOCOL FOR USE WITH A DUAL VOLTAGE ELECTROLYSIS APPARATUS

(75) Inventor: Nehemia Davidson, Rosh-Haayin (IL)

(73) Assignee: Nehemia Davidson (IL)

( * ) Notice: Subject to any disclaimer, the term of this patent is extended or adjusted under 35 U.S.C. 154(b) by 804 days.

This patent is subject to a terminal disclaimer.

(21) Appl. No.: 12/151,292

(22) Filed: May 6, 2008

(65) Prior Publication Data

US 2008/0296168 A1 Dec. 4, 2008

(30) Foreign Application Priority Data

May 30, 2007 (CA) .................................. 2590481

(51) Int. Cl.
*C25B 9/06* (2006.01)
*C25B 1/10* (2006.01)
(52) U.S. Cl. ............... 204/229.5; 204/262; 205/341; 205/628
(58) Field of Classification Search ............... 204/229.4, 204/229.5, 230.2, 230.5, 230.6, 230.7, 252, 204/262, 266; 205/341, 628, 629, 630, 631, 205/632, 637, 638, 39, 693
See application file for complete search history.

(56) References Cited

U.S. PATENT DOCUMENTS

| 6,576,096 | B1* | 6/2003 | Andrews et al. | 205/637 |
| 7,611,618 | B2* | 11/2009 | Davidson | 205/341 |
| 7,615,138 | B2* | 11/2009 | Davidson | 204/252 |
| 7,682,492 | B2* | 3/2010 | Bradley | 204/230.2 |
| 2004/0084325 | A1* | 5/2004 | Weinberg et al. | 205/628 |
| 2004/0200731 | A1* | 10/2004 | Sullivan | 205/628 |
| 2008/0296167 | A1* | 12/2008 | Davidson | 205/334 |

* cited by examiner

*Primary Examiner* — Keith Hendricks
*Assistant Examiner* — Steven A Friday
(74) *Attorney, Agent, or Firm* — Patent Law Office of David G. Beck

(57) ABSTRACT

An electrolysis system (100) and method of using same is provided. In addition to an electrolysis tank (101) and a membrane (105) separating the tank into two regions, the system includes at least one pair of low voltage electrodes (115/116) of a first type, at least one pair of low voltage electrodes (117/118) of a second type, and at least one pair of high voltage electrodes (121/122). The low voltage applied to the low voltage electrodes (115/116/117/118) and the high voltage applied to the high voltage electrodes (121/122) is pulsed with the pulses occurring simultaneously with the same pulse duration. Low voltage is also applied to the low voltage electrodes (115/116/117/118) during part, or all, of the period of each cycle occurring between pulses.

22 Claims, 20 Drawing Sheets

MULTI-PULSE PROTOCOL FOR USE WITH A DUAL VOLTAGE ELECTROLYSIS APPARATUS

CROSS-REFERENCE TO RELATED APPLICATION

Under 35 U.S.C. 119, the present application claims the benefit of the earlier filing date and the right of priority to Canadian Patent Application Serial No. 2,590,481, filed May 30, 2007, the disclosure of which is hereby incorporated by reference for any and all purposes.

FIELD OF THE INVENTION

The present invention relates generally to electrolysis systems and, more particularly, to a high efficiency electrolysis system and methods of using same.

BACKGROUND OF THE INVENTION

Fossil fuels, in particular oil, coal and natural gas, represent the primary sources of energy in today's world. Unfortunately in a world of rapidly increasing energy needs, dependence on any energy source of finite size and limited regional availability has dire consequences for the world's economy. In particular, as a country's need for energy increases, so does its vulnerability to disruption in the supply of that energy. Additionally, as fossil fuels are the largest single source of carbon dioxide emissions, a greenhouse gas, continued reliance on such fuels can be expected to lead to continued global warming. Accordingly it is imperative that alternative, clean and renewable energy sources be developed that can replace fossil fuels.

Hydrogen-based fuel is currently one of the leading contenders to replace fossil fuel. However in order to successfully transition from oil-based and coal-based fuels to a hydrogen-based fuel, significant improvements must be made in terms of hydrogen production, hydrogen storage and distribution, and hydrogen engines. Clearly the state of the art in each of these developmental areas impacts the other areas. For example, if a method of inexpensively producing hydrogen in small production plants can be developed, production plants can be situated close to the end user, thus avoiding the need for extremely complex and costly distribution systems.

Although a number of techniques can be used to produce hydrogen, the primary technique is by steam reforming natural gas. In this process thermal energy is used to react natural gas with steam, creating hydrogen and carbon dioxide. Although this process is well developed, due to its reliance on fossil fuels and the release of carbon dioxide during production, it does not alleviate the need for fossil fuels nor does it lower the environmental impact of its use over that of traditional fossil fuels. Other, less developed hydrogen producing techniques include (i) biomass fermentation in which methane fermentation of high moisture content biomass creates fuel gas, a small portion of which is hydrogen; (ii) biological water splitting in which certain photosynthetic microbes produce hydrogen from water during their metabolic activities; (iii) photoelectrochemical processes using either soluble metal complexes as a catalyst or semiconducting electrodes in a photochemical cell; (iv) thermochemical water splitting using chemicals such as bromine or iodine, assisted by heat, to split water molecules; (v) thermolysis in which concentrated solar energy is used to generate temperatures high enough to split methane into hydrogen and carbon; and (vi) electrolysis.

Electrolysis as a means of producing hydrogen has been known and used for over 80 years. In general, electrolysis of water uses two electrodes separated by an ion conducting electrolyte. During the process hydrogen is produced at the cathode and oxygen is produced at the anode, the two reaction areas separated by an ion conducting diaphragm. Electricity is required to drive the process. An alternative to conventional electrolysis is high temperature electrolysis, also known as steam electrolysis. This process uses heat, for example produced by a solar concentrator, as a portion of the energy required to cause the needed reaction. Although lowering the electrical consumption of the process is desirable, this process has proven difficult to implement due to the tendency of the hydrogen and oxygen to recombine at the technique's high operating temperatures.

Although a variety of improvements have been devised to improve upon the efficiency of the electrolytic hydrogen production system, to date none of them have been able to make the process efficient enough to make hydrogen-based fuel a viable alternative to fossil fuels. Accordingly, what is needed in the art is a means for efficiently producing hydrogen, the means preferably being small enough to minimize the need for an overly complex distribution system. The present invention provides such a system and method of use.

SUMMARY OF THE INVENTION

The present invention provides a system and method of using same for achieving high hydrogen output flow rates utilizing electrolysis. In addition to an electrolysis tank, a membrane separating the tank into two regions, hydrogen gas and oxygen gas outlets, and means for filling the tank with liquid, the system includes three types of electrodes. For each type of electrode, the system includes at least one pair of electrodes with each pair of electrodes including a cathode and an anode. Preferably the liquid within the tank is comprised of one or more of; water, deuterated water, tritiated water, semiheavy water, heavy oxygen water, and/or any other water containing an isotope of either hydrogen or oxygen. Preferably the liquid within the electrolysis tank includes an electrolyte with a concentration in the range of 0.05 to 10 percent by weight, more preferably in the range of 0.05 to 2.0 percent by weight, and still more preferably in the range of 0.1 to 0.5 percent by weight.

The first and second types of electrodes are connected to one or more low voltage sources while the third type of electrode is connected to a high voltage source. The first and second types of electrodes are positioned between the third type of electrodes, i.e., the separation distance between the high voltage electrodes is greater than the separation distance of either the first or second types of low voltage electrodes.

The power supplied by the low and high voltage sources follows a protocol that enhances hydrogen output. In particular, the power applied to all three types of electrodes is simultaneously pulsed, preferably at a frequency between 50 Hz and 1 MHz, and more preferably at a frequency of between 100 Hz and 10 kHz. The pulse width (i.e., pulse duration) is preferably between 0.01 and 75 percent of the time period (i.e., cycle) defined by the frequency, and more preferably between 1 and 50 percent of the time period defined by the frequency. In between each of these primary pulses, low voltage is applied to the low voltage electrodes. The low voltage applied during this period can be continuous or pulsed, with a pulse duration anywhere within a range of a small fraction of the remaining time period to all of the remaining time period. In between the primary pulses, the applied low voltage is preferably between 10 and 100 percent of the low voltage applied during the primary pulses, and more preferably between 25 and 75 percent of the low voltage applied during the primary pulses.

During the primary pulses, preferably the ratio of the high voltage to the low voltage is at least 5:1, more preferably within the range of 5:1 to 100:1, still more preferably within the range of 5:1 to 33:1, and still more preferably within the range of 5:1 to 20:1. Preferably the low voltage is between 3 and 1500 volts, more preferably between 12 and 750 volts. Preferably the high voltage is between 50 volts and 50 kilovolts, more preferably between 100 volts and 5 kilovolts.

The first and second types of low voltage electrodes are fabricated from different materials. The first, second and third types of electrodes can utilize any combination of surface shapes, including flat and curved. Each pair, i.e., cathode and anode, of electrodes of each type can either be positioned parallel to one another, or not parallel to one another. Although the electrodes can be fabricated from a variety of materials, preferably the material for each electrode type is selected from the group consisting of steel, nickel, copper, iron, stainless steel, cobalt, manganese, zinc, titanium, platinum, palladium, aluminum, lithium, magnesium, boron, carbon, graphite, carbon-graphite, metal hydrides and alloys thereof.

In at least one embodiment, the electrolysis system is cooled. Cooling is preferably achieved by thermally coupling at least a portion of the electrolysis system to a portion of a conduit containing a heat transfer medium. The conduit can surround the electrolysis tank, be integrated within the walls of the electrolysis tank, or be contained within the electrolysis tank.

In at least one embodiment, the electrolysis system also contains a system controller. The system controller can be used to perform the desired pulse protocol. The system controller can also be used to perform system optimization, either during an initial optimization period or repeatedly throughout system operation.

A further understanding of the nature and advantages of the present invention may be realized by reference to the remaining portions of the specification and the drawings.

DESCRIPTION OF THE SPECIFIC EMBODIMENTS

Figure 1:
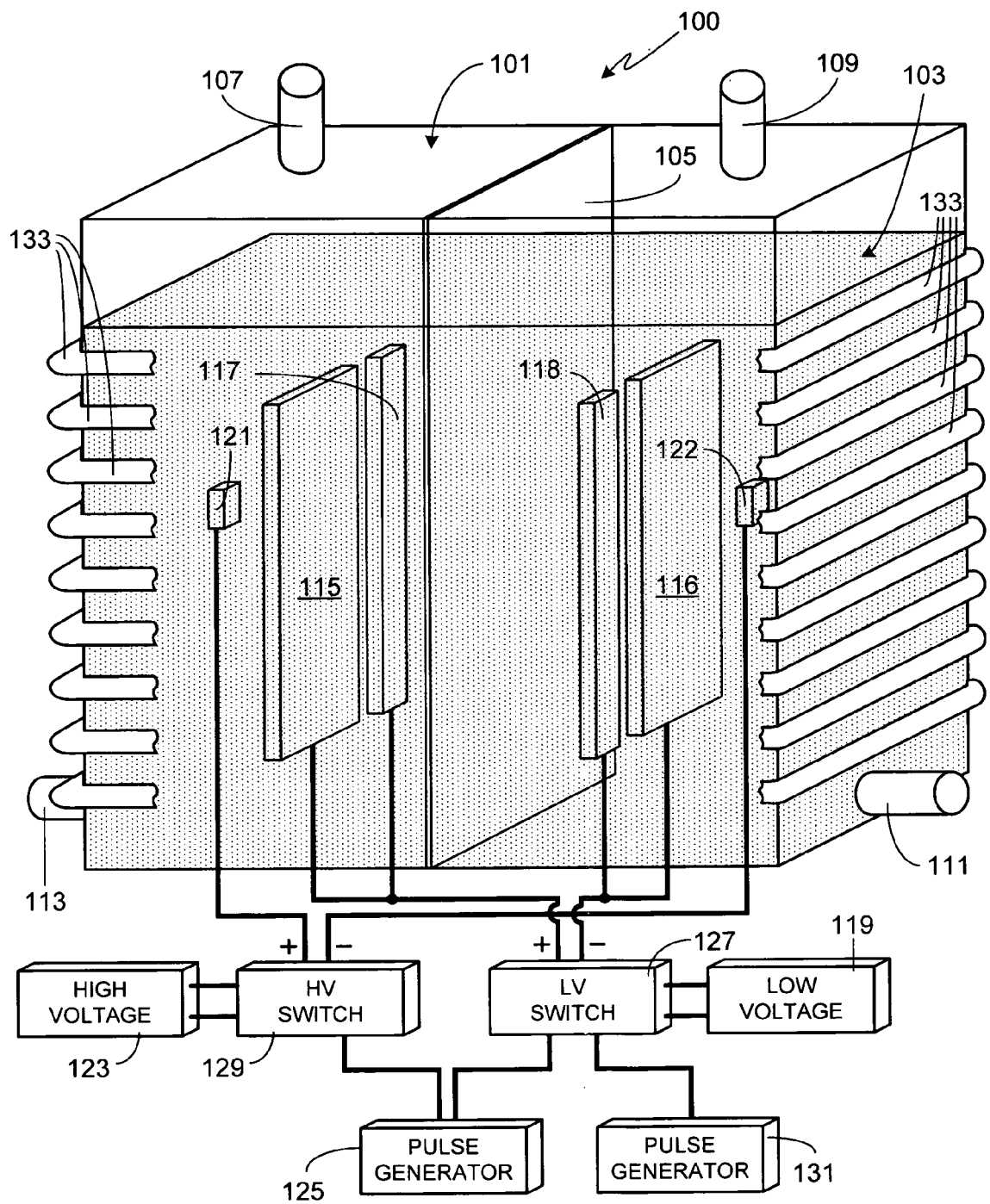
FIG. 1 is an illustration of an exemplary, and preferred, embodiment of the invention.

FIG. 1 is an illustration of an exemplary, and preferred, embodiment of the invention which is used to produce hydrogen at a high rate. Electrolysis system 100 includes a tank 101 comprised of a non-conductive material, the size of the tank depending primarily upon the desired output level for the system, for example the desired quantity/flow rate of hydrogen to be generated. Although tank 101 is shown as having a rectangular shape, it will be appreciated that the invention is not so limited and that tank 101 can utilize other shapes, for example cylindrical, square, irregularly-shaped, etc. Tank 101 is substantially filled with liquid 103. In at least one preferred embodiment, liquid 103 is comprised of water with an electrolyte, the electrolyte being either an acid electrolyte or a base electrolyte. Exemplary electrolytes include potassium hydroxide and sodium hydroxide. The term "water" as used herein refers to water ($H_2O$), deuterated water (deuterium oxide or $D_2O$), tritiated water (tritium oxide or $T_2O$), semiheavy water (HDO), heavy oxygen water ($H_2^{18}O$ or $H_2^{17}O$) or any other water containing an isotope of either hydrogen or oxygen, either singly or in any combination thereof (for example, a combination of $H_2O$ and $D_2O$).

A typical electrolysis system used to decompose water into hydrogen and oxygen gases utilizes relatively high concentrations of electrolyte. The present invention, however, has been found to work best with relatively low electrolyte concentrations, thereby maintaining a relatively high initial water resistivity. Preferably the water resistivity prior to the addition of an electrolyte is on the order of 1 to 28 megohms. Preferably the concentration of electrolyte is in the range of 0.05 percent to 10 percent by weight, more preferably the concentration of electrolyte is in the range of 0.05 percent to 2.0 percent by weight, and still more preferably the concentration of electrolyte is in the range of 0.1 percent to 0.5 percent by weight.

Separating tank 101 into two regions is a membrane 105. Membrane 105 permits ion/electron exchange between the two regions of tank 101 while keeping separate the oxygen and hydrogen bubbles produced during electrolysis. Maintaining separate hydrogen and oxygen gas regions is important not only as a means of allowing the collection of pure hydrogen gas and pure oxygen gas, but also as a means of minimizing the risk of explosions due to the inadvertent recombination of the two gases. Exemplary materials for membrane 105 include, but are not limited to, polypropylene, tetrafluoroethylene, asbestos, etc. In at least one preferred embodiment, membrane 105 is 25 microns thick and comprised of polypropylene.

As noted herein, the present system is capable of generating considerable heat. Accordingly, system components such as tank 101 and membrane 105 that are expected to be subjected to the heat generated by the system must be fabricated from suitable materials and designed to indefinitely accommodate the intended operating temperatures as well as the internal tank pressure. For example, in at least one preferred embodiment the system is designed to operate at a temperature of approximately 90° C. at standard pressure. In an alternate exemplary embodiment, the system is designed to operate at elevated temperatures (e.g., 100° C. to 150° C.) and at sufficient pressure to prevent boiling of liquid 103. In yet another alternate exemplary embodiment, the system is designed to operate at even higher temperatures (e.g., 200° C. to 350° C.) and higher pressures (e.g., sufficient to prevent boiling). Accordingly, it will be understood that the choice of materials (e.g., for tank 101 and membrane 105) and the design of the system (e.g., tank wall thicknesses, fittings, etc.) will vary, depending upon the intended system operational parameters, primarily temperature and pressure.

Other standard features of electrolysis tank 101 are gas outlets 107 and 109. As hydrogen gas is produced at the cathode and oxygen gas is produced at the anode, in the exemplary embodiment shown in FIG. 1 oxygen gas will exit tank 101 through outlet 107 while hydrogen gas will exit through outlet 109. Replenishment of liquid 103 is preferably through a separate conduit, for example conduit 111. In at least one embodiment of the invention, another conduit 113 is used to remove liquid 103 from the system. If desired, a single conduit can be used for both liquid removal and replenishment. It will be appreciated that the system can either be periodically refilled or water and electrolyte can be continuously added at a very slow rate during system operation.

It will be appreciated that a system utilizing electrolysis system 100 to produce hydrogen will also include means for either storing the produced gases, e.g., hydrogen storage tanks, or means for delivering the produced gas to the point of consumption, e.g., pipes and valves, as well as flow gauges, pressure gauges, gas compressors, gas driers, gas purifiers, water purifiers, water pumps, etc.

The electrolysis system of the invention uses three types of electrodes, each type of electrode being comprised of one or more electrode pairs with each electrode pair including a cathode (i.e., a cathode coupled electrode) and an anode (i.e., an anode coupled electrode). All cathodes, regardless of the type, are kept in one region of tank 101 while all anodes, regardless of the type, are kept in the other tank region, the two tank regions separated by membrane 105. In the embodiment illustrated in FIG. 1, each type of electrode includes a single pair of electrodes.

The first pair of electrodes, electrodes 115/116, and the second set of electrodes, electrodes 117/118, are both low voltage electrodes and, in the illustrated embodiment, coupled to the same voltage source 119. The third set of electrodes, electrodes 121/122, are coupled to a high voltage source 123. As described and illustrated, voltage source 119 is referred to and labeled as a 'low' voltage source not because of the absolute voltage produced by the source, but because the output of voltage source 119 is maintained at a lower output voltage than the output of voltage source 123. Preferably and as shown, the individual electrodes of each pair of electrodes are parallel to one another; i.e., the face of electrode 115 is parallel to the face of electrode 116, the face of electrode 117 is parallel to the face of electrode 118, and the face of electrode 121 is parallel to the face of electrode 122. Additionally, and as shown, in at least one preferred embodiment electrodes 117 and 118 are not positioned directly across from one another, rather they are on opposite sides of electrodes 115 and 116 as shown.

Although electrode pairs 115/116 and 117/118 are both low voltage electrodes and are preferably coupled to the same voltage supply, these electrode pairs are quite different, both in terms of composition and size. In one preferred embodiment, electrodes 115/116 are comprised of titanium while electrodes 117/118 are comprised of steel. It should be appreciated, however, that other materials can be used as long as electrodes 115/116 are made up of a different material from electrodes 117/118. In addition to titanium and steel, other exemplary materials that can be used for electrodes 115, 116, 117 and 118 include, but are not limited to, copper, iron, stainless steel, cobalt, manganese, zinc, nickel, platinum, palladium, aluminum, lithium, magnesium, boron, carbon, graphite, carbon-graphite, metal hydrides and alloys of these materials. As used in the present specification, a metal hydride refers to any compound of a metal and hydrogen or an isotope of hydrogen (e.g., deuterium, tritium).

Preferably the faces of electrodes 115 and 117 are coplanar as are the faces of electrodes 116 and 118. Also preferably, the combined area made up by the faces of electrodes 115 and 117, and similarly the faces of electrodes 116 and 118, cover a large percentage of the cross-sectional area of tank 101. In an exemplary embodiment, the combined area of the faces of electrodes 115 and 117, and similarly the faces of electrodes 116 and 118, cover between 70 percent and 90 percent of the cross-sectional area of the electrolysis tank. Although not required, typically electrodes 117 and 118 have a much smaller surface area than that of electrodes 115 and 116, for example on the order of a sixth of the area. Also preferably, the height of electrodes 115, 116, 117, and 118 are close to the liquid level of liquid 103 within tank 101. Although the separation distance between electrode pairs is dependent upon a variety of factors (e.g., tank size, voltage/current, etc.), in at least one preferred embodiment the separation of the plane containing electrodes 115 and 117 and the plane containing electrodes 116 and 118 is between 0.2 millimeters and 15 centimeters.

Electrodes 121/122 are positioned outside of electrodes 115/116/117/118 (i.e., outside of the planes containing electrodes 115/117 and 116/118). In other words, the separation distance between electrodes 121 and 122 is greater than the distance separating the planes containing electrodes 115/117 and 116/118. Electrodes 121/122 may be larger, smaller or the same size as either electrodes 115/116 or electrodes 117/118. Preferably electrodes 121 and 122 are fabricated from titanium, although other materials can be used (e.g., steel, copper, iron, stainless steel, cobalt, manganese, zinc, nickel, platinum, palladium, aluminum, lithium, magnesium, boron, carbon, graphite, carbon-graphite, metal hydrides and alloys of these materials).

As previously noted, the voltage applied to electrode pair 121/122 is greater than that applied to electrodes 115, 116, 117 and 118. Preferably the ratio of the high voltage to the low voltage is at least 5:1, more preferably the ratio is between 5:1 and 100:1, still more preferably the ratio is between 5:1 and 33:1, and even still more preferably the ratio is between 5:1 and 20:1. Preferably the high voltage generated by source 123 is within the range of 50 volts to 50 kilovolts, and more preferably within the range of 100 volts to 5 kilovolts. Preferably the low voltage generated by source 119 is within the range of 3 volts to 1500 volts, and more preferably within the range of 12 volts to 750 volts.

Figure 2:
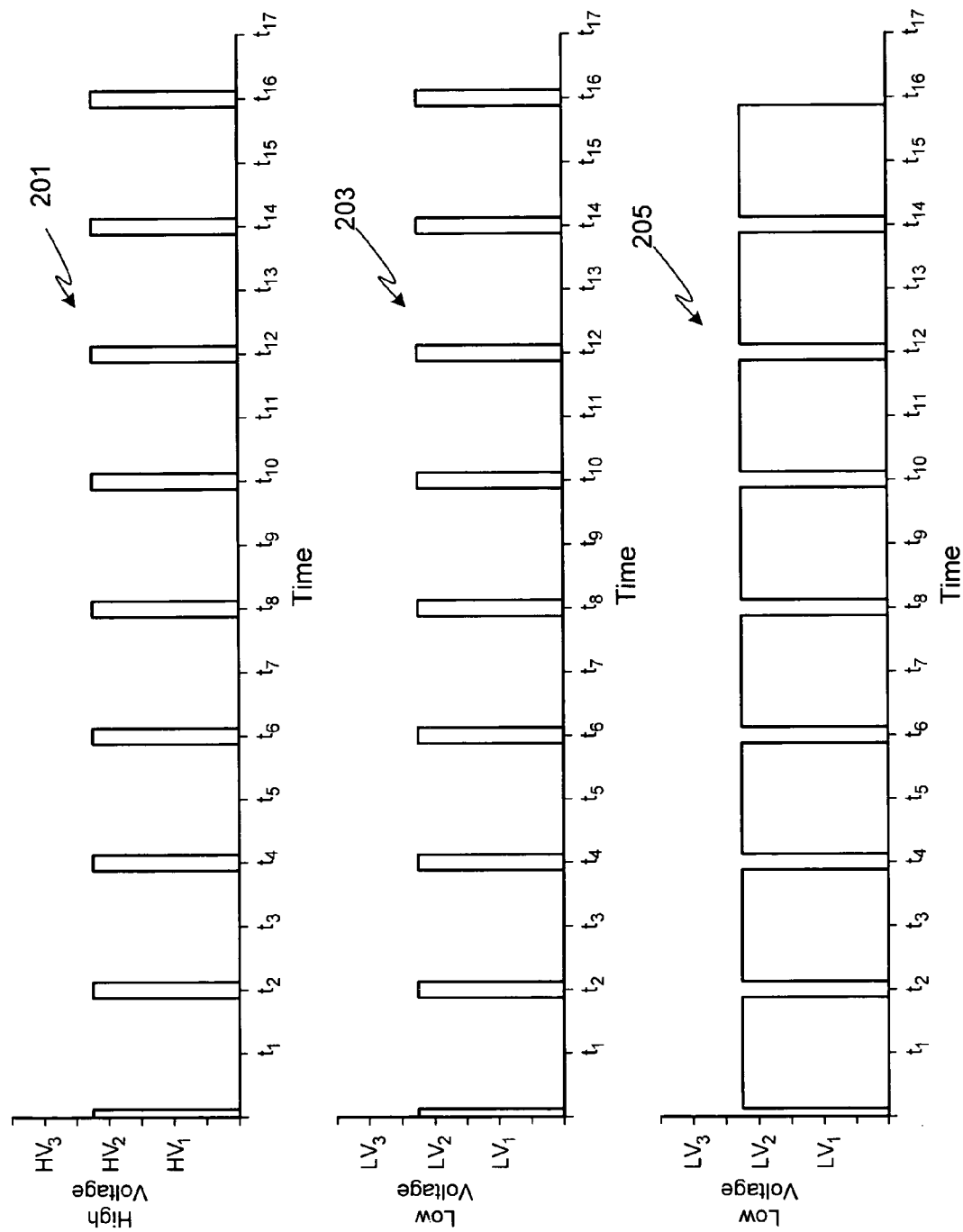
FIG. 2 is a graphical illustration of the pulse regimens applied to the low and high voltage electrodes in a preferred embodiment of the invention.

Rather than continually apply voltage to the electrodes, sources 119 and 123 are pulsed following a pulse protocol that provides enhanced hydrogen output. FIG. 2 graphically illustrates a preferred pulse regimen applied to the low and high voltage electrodes. It should be understood that FIG. 2 is only meant to illustrate and clarify the applied pulse regimens and the relationship between the high voltage pulses and the low voltage pulses; FIG. 2 is not intended as an accurate representation of either the absolute or relative values for voltage, pulse frequency or pulse duration. Accordingly, both the voltages and the times shown in FIG. 2 are provided in arbitrary units. Additionally it will be appreciated that the invention can utilize other pulse regimens as described further below.

Figure 3:
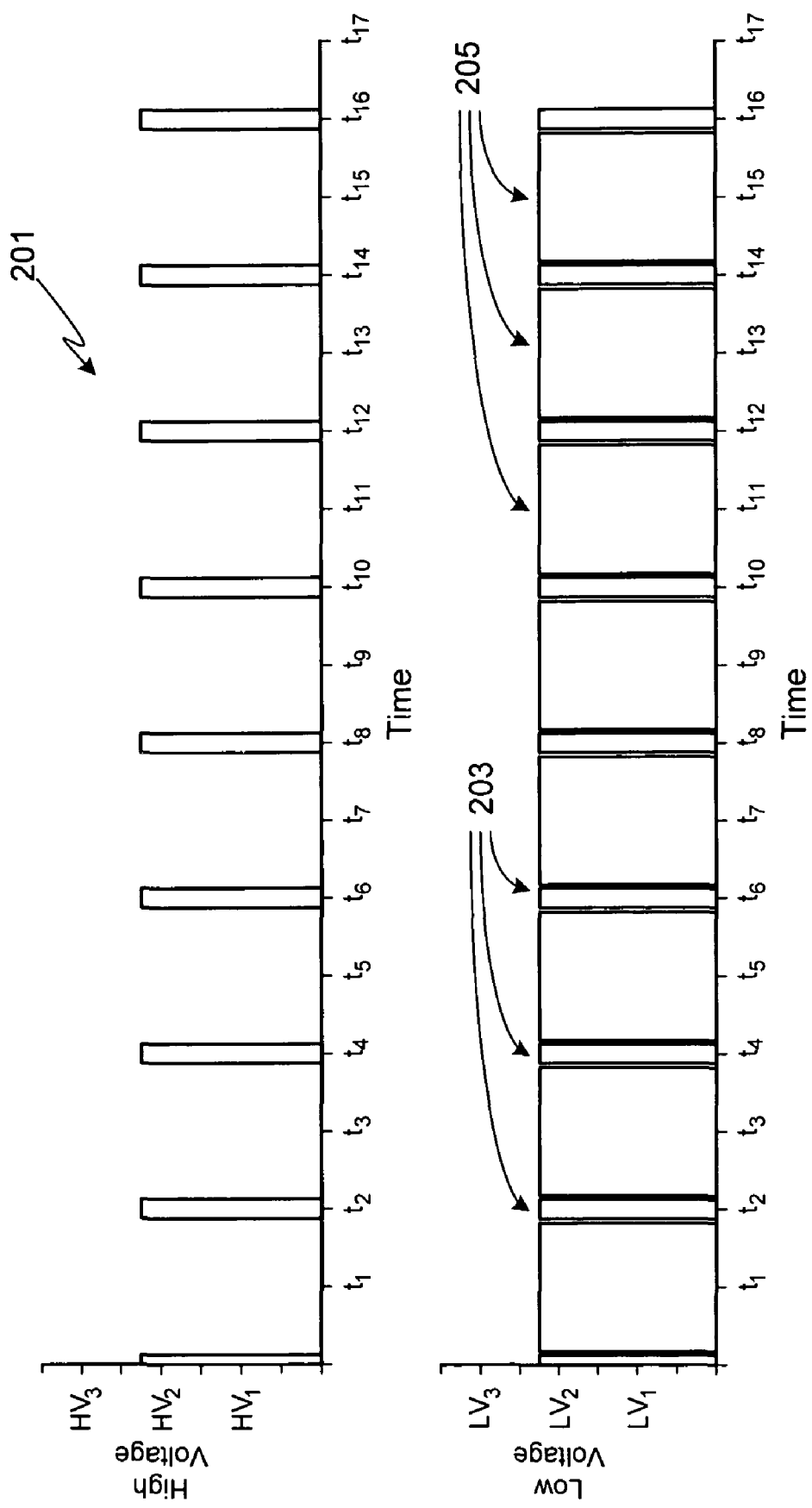
FIG. 3 is an alternate representation of the low voltage and high voltage pulse regimens shown in FIG. 2.

Graphical representation 201 illustrates the pulses of high voltage applied to the high voltage electrodes (e.g., electrodes 121/122) while graphical representations 203 and 205 illustrate the two sets of pulses applied to the low voltage electrodes (e.g., electrodes 115-118). As shown, one set of low voltage pulses, i.e., the pulses of graph 203, are applied simultaneously with the high voltage pulses, i.e., the pulses of graph 201. The second set of low voltage pulses, i.e., the pulses of graph 205, are interleaved between the first set of low voltage pulses. FIG. 3 illustrates this same pulse protocol by overlaying graphs 203 and 205. Note that in terms of terminology as used herein, the term "primary" pulse refers to the overlapping high voltage and low voltage pulses (e.g., graphs 201 and 203) while the term "secondary" pulse refers to the low voltage pulses (e.g., graph 205) that are interleaved between the primary pulses.

The frequency of the primary pulses, i.e., the simultaneous low and high voltage pulses, is preferably between 50 Hz and 1 MHz, and more preferably between 100 Hz and 10 kHz. The pulse width (i.e., pulse duration) is preferably between 0.01 and 75 percent of the time period (i.e., cycle) defined by the frequency, and more preferably between 1 and 50 percent of the time period defined by the frequency. Thus, for example, for a frequency of 150 Hz, the pulse duration is preferably in the range of 0.67 microseconds to 5 milliseconds, and more preferably in the range of 66.7 microseconds to 3.3 milliseconds. Alternately, for example, for a frequency of 1 kHz, the pulse duration is preferably in the range of 0.1 microseconds to 0.75 milliseconds, and more preferably in the range of 10 microseconds to 0.5 milliseconds. The primary pulses are simultaneously applied to the high voltage electrodes (e.g., electrodes 121/122 of FIG. 1) and the low voltage electrodes (e.g., electrodes 115-118 of FIG. 1) by sources 123 and 119, respectively. In other words, the pulses applied to electrodes 121/122 coincide with the primary pulses applied to electrodes 115, 116, 117 and 118.

The secondary pulses, i.e., those pulses that are only applied to the low voltage electrodes and that occur in-between the primary pulses, occur at the same frequency as that selected for the primary pulses. The maximum duration of the secondary pulses depends on the pulse width of the primary pulses as well as the pulse rise and fall times between successive pulses. Thus if the pulse width of the primary pulses are between 0.01 and 75 percent of the time period defined by the selected frequency, then the pulse width of the secondary pulses are between 99.99 and 25 percent of the defined time period, less pulse rise/fall times. Similarly if the pulse width of the primary pulses are between 1 and 50 percent of the time period defined by the selected frequency, then the pulse width of the secondary pulses are between 99 and 50 percent of the defined time period, less pulse rise/fall times. In the prior example of a 150 Hz pulse frequency, which defines a cycle time (i.e., time period) of 6.7 milliseconds, for a preferred primary pulse duration of 0.67 microseconds to 5 milliseconds, the secondary pulse duration is between 6,699.33 microseconds and 1.7 milliseconds, less the pulse rise/fall time. For a preferred primary pulse duration of 66.7 microseconds to 3.3 milliseconds, the secondary pulse duration is between 6,633.3 microseconds and 3.4 milliseconds, less the pulse rise/fall time. In the prior example of 1 kHz, which defines a cycle time of 1 millisecond, a primary pulse duration of 0.1 microseconds to 0.75 milliseconds yields a secondary pulse duration of 999.9 microseconds to 0.25 milliseconds (less pulse rise/fall time) while a primary pulse duration of 10 microseconds to 0.5 milliseconds yields a secondary pulse duration of 990 microseconds to 0.5 milliseconds (less pulse rise/fall time).

It will be appreciated that there are numerous techniques of applying the primary/secondary pulse protocol described herein to the high voltage/low voltage electrodes. For example in the embodiment illustrated in FIG. 1, an external pulse generator 125 controls a pair of switches, i.e., low voltage switch 127 and high voltage switch 129 which, in turn, control the output of voltage sources 119 and 123. Accordingly pulse generator 125 provides a simple means of simultaneously applying high voltage to the high voltage electrodes and low voltage to the low voltage electrodes. In this embodiment a second pulse generator 131, coupled only to low voltage switch 127, controls the secondary low voltage pulses.

Figure 4:
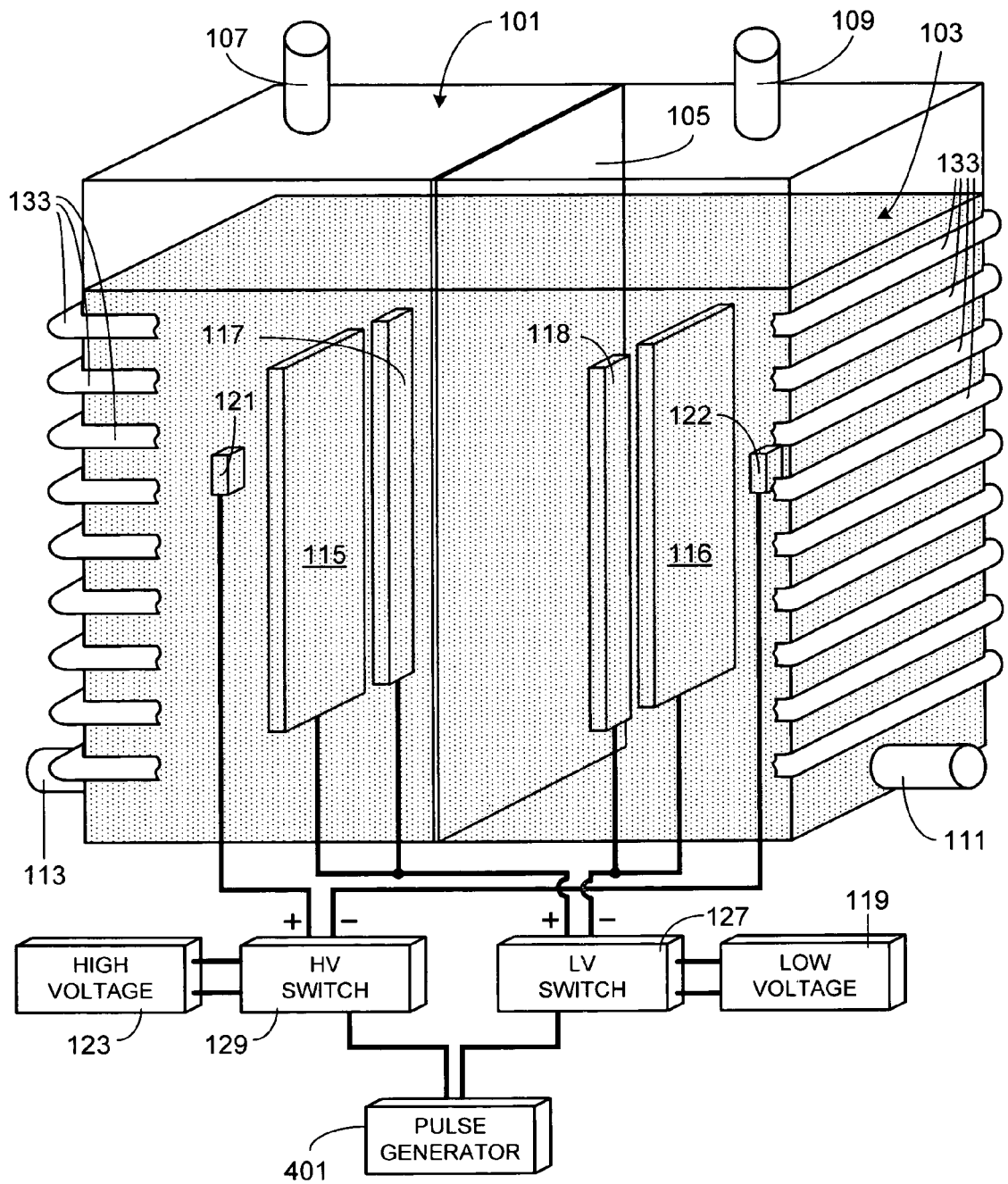
FIG. 4 is an illustration of an alternate embodiment utilizing a single pulse generator.
Figure 5:
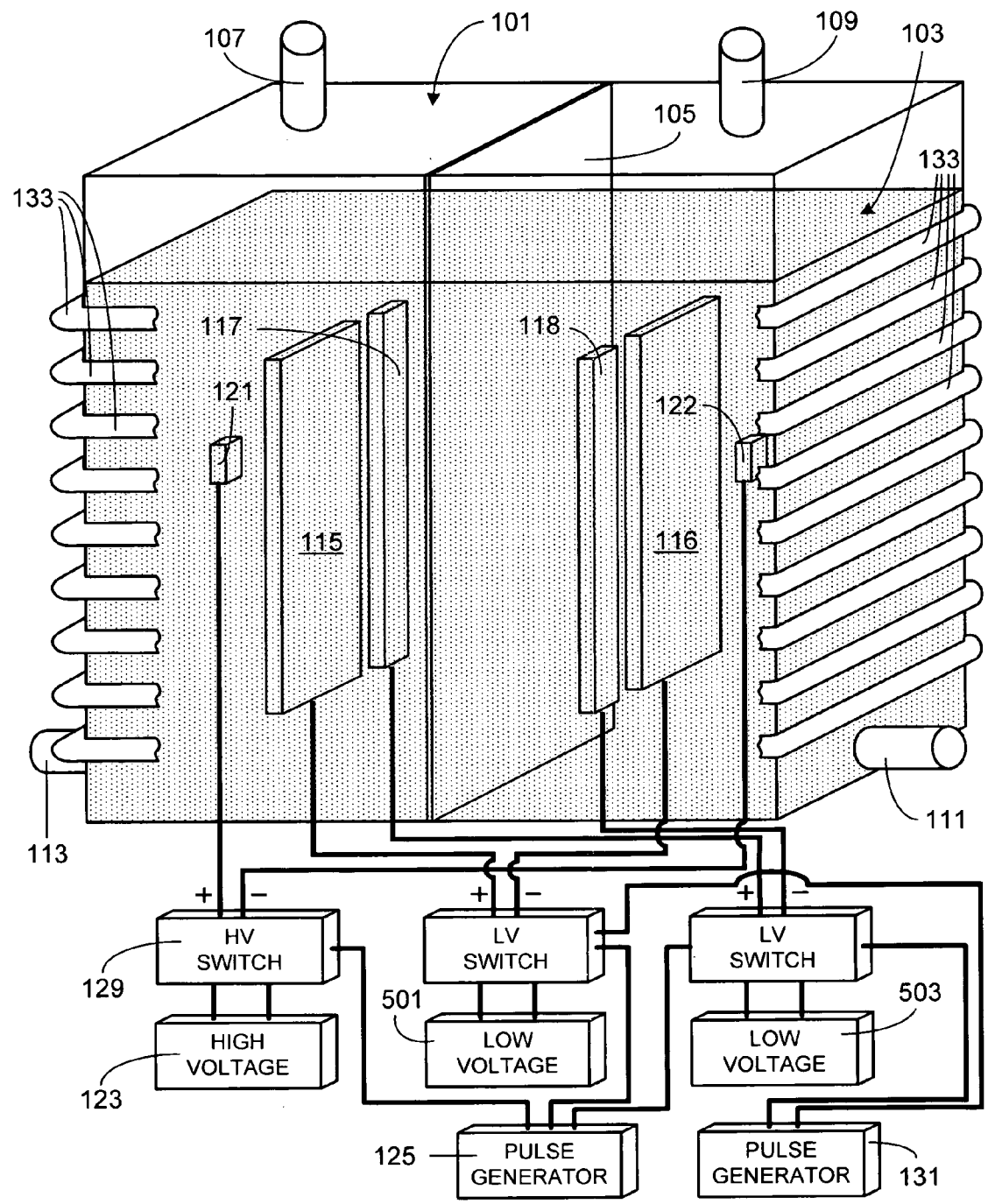
FIG. 5 is an illustration of an alternate embodiment utilizing multiple low voltage power supplies.

Although not exhaustive of every possible implementation, FIGS. 4-7 illustrate four other approaches to achieving the desired pulse protocol of the invention. In the exemplary embodiment shown in FIG. 4, the two pulse generators of system 100 have been replaced with a single pulse generator 401 capable of driving the required complex pulse protocol of the invention. Alternately, in the exemplary embodiment shown in FIG. 5, two low voltage sources 501 and 503 are coupled to low voltage electrodes 115/116 and low voltage electrodes 117/118, respectively. As in system 100, a pair of pulse generators 125/131 are used to control the primary and secondary pulses of the pulse protocol although a single pulse generator capable of performing such operations can also be used as shown in FIG. 4. The constraints placed on low voltage sources 501 and 503 are the same as placed on low voltage source 119 of the embodiment shown in FIG. 1. Alternately, in the exemplary embodiment shown in FIG. 6, there are three pulse generators 601-603, each pulse generator being dedicated to a specific combination of a voltage source and a switch. Although it is possible to independently control each pulse generator, preferably all three pulse generators are coupled to a system controller 605, system controller 605 insuring that the pulse timing occurs as desired. Additionally in a preferred embodiment of the invention, system controller 605 also controls the voltage of each of the power supplies 123, 501 and 503, thus simplifying system operation and/or system optimization. Alternately, in the exemplary embodiment shown in FIG. 7, each type of electrode (i.e., high voltage electrodes, low voltage electrodes of a first type, and low voltage electrodes of a second type) is coupled to a switching power supply (i.e., supplies 701-703) that includes an internal pulse generator. As in the previous embodiment, preferably a system controller 705 provides overall system control, synchronization and optimization. It will be appreciated that a system controller can also be used in other system configurations, for example controlling the pair of pulse generators 125 and 131 shown in FIGS. 1 and 5 as well as the power supplies.

Figure 8:
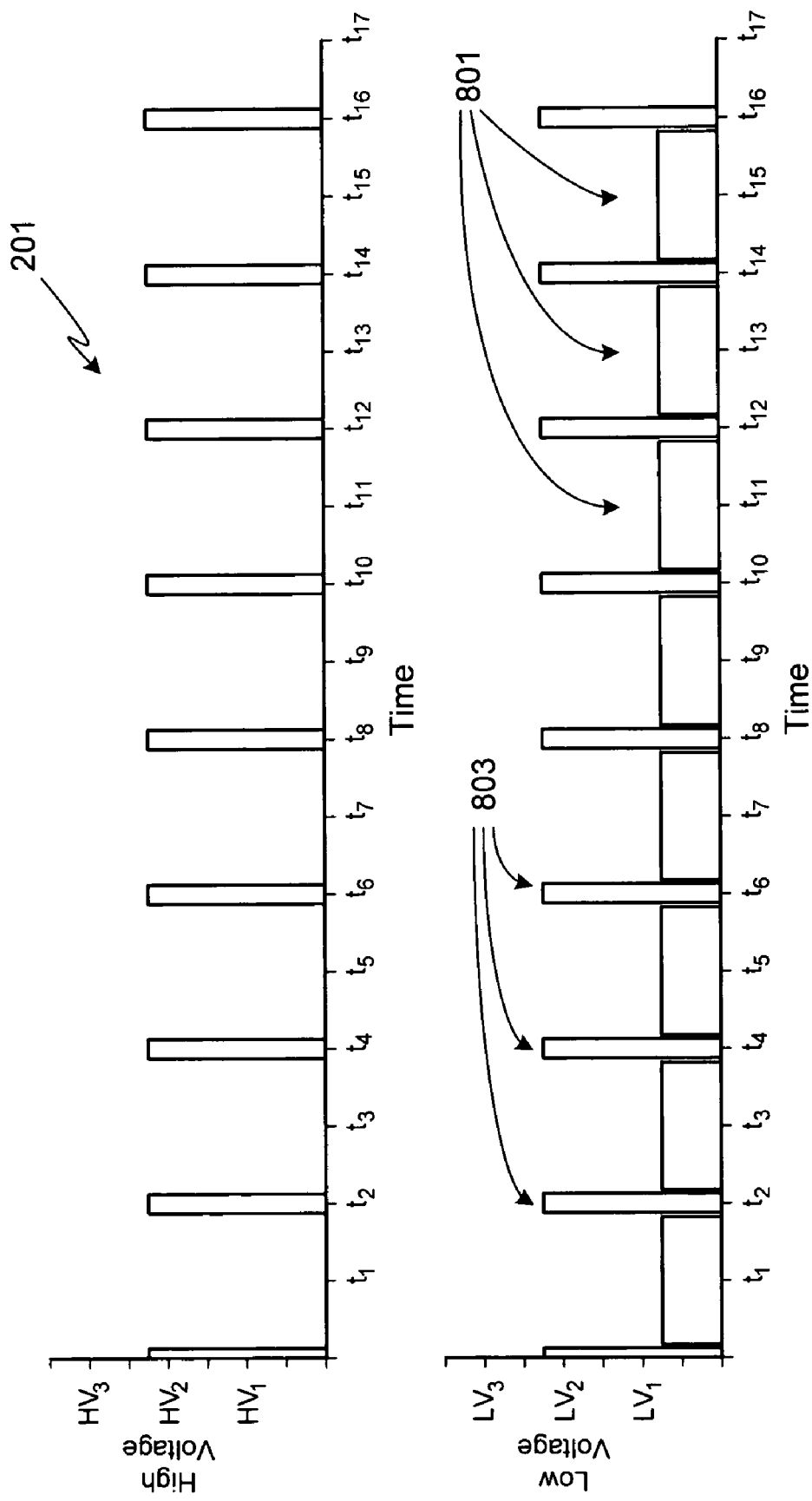
FIG. 8 is a graphical illustration of the pulse regimens applied to the low and high voltage electrodes in a preferred embodiment of the invention in which the voltage applied to the low voltage electrodes during the primary pulse is higher than the voltage applied to the low voltage electrodes during the secondary pulse.

As previously noted, there are numerous minor variations of the pulse protocol of the invention that can used to achieve high rates of hydrogen production. For example, as illustrated in FIG. 8, the voltage applied to the low voltage electrodes during the secondary pulse does not have to match the voltage applied to the low voltage electrodes during the primary pulse. Although the low voltage applied during the secondary pulses can be higher than that applied during the primary pulses, preferably and as shown in FIG. 8, the voltage applied during the secondary pulses 801 is lower, and more preferably much lower, than the voltage applied to the low voltage electrodes during the primary pulses 803. Preferably the voltage applied to the low voltage electrodes during the secondary pulses is between 10 percent and 100 percent of the voltage applied to the low voltage electrodes during the primary pulses. More preferably, the voltage applied to the low voltage electrodes during the secondary pulses is between 25 percent and 75 percent of the voltage applied to the low voltage electrodes during the primary pulses.

Figure 9:
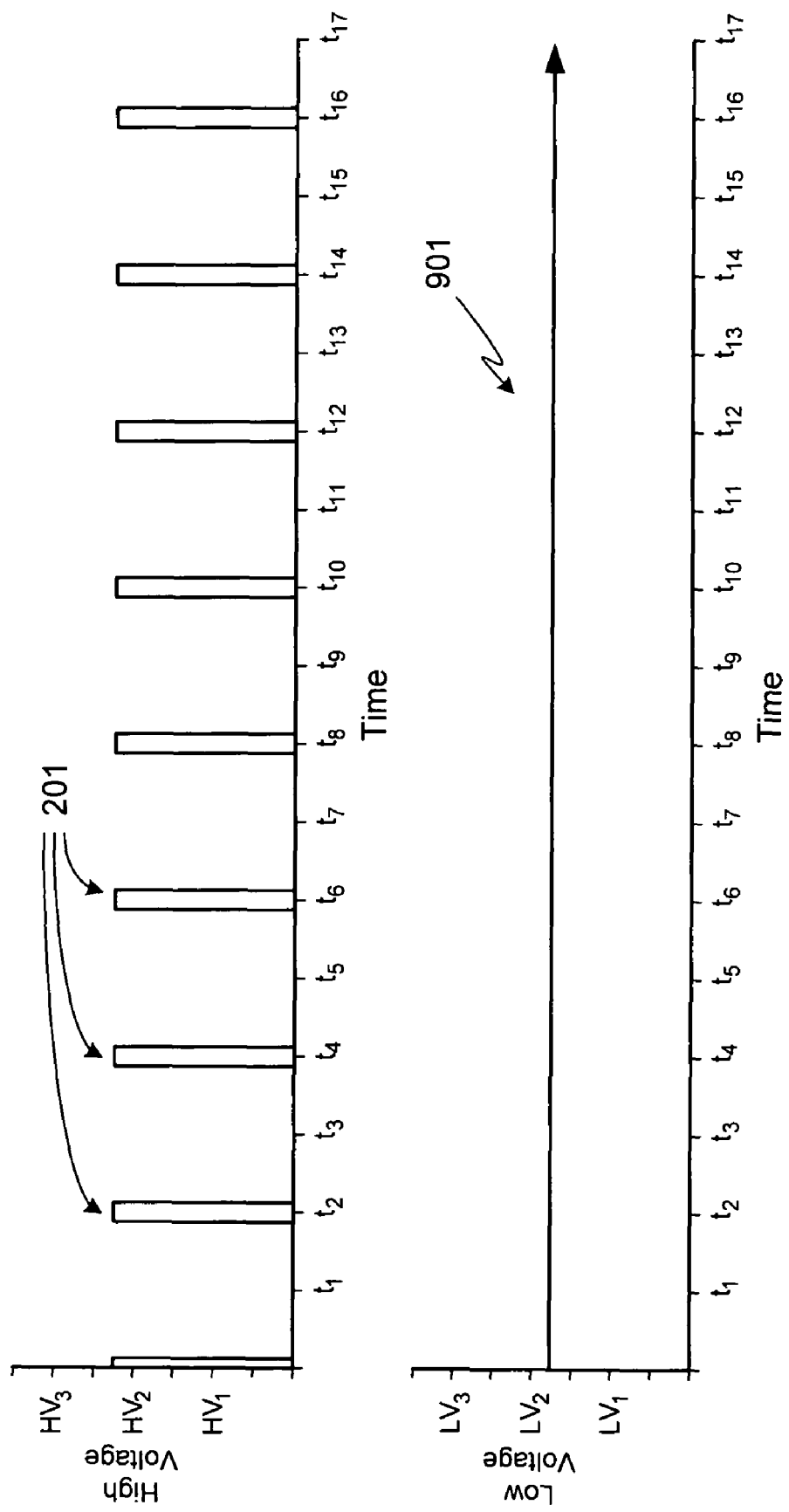
FIG. 9 is a graphical illustration of the pulse regimens applied to the low and high voltage electrodes in a preferred embodiment of the invention in which the high voltage is pulsed and the low voltage is continuously applied to the low voltage electrodes.
Figure 10:
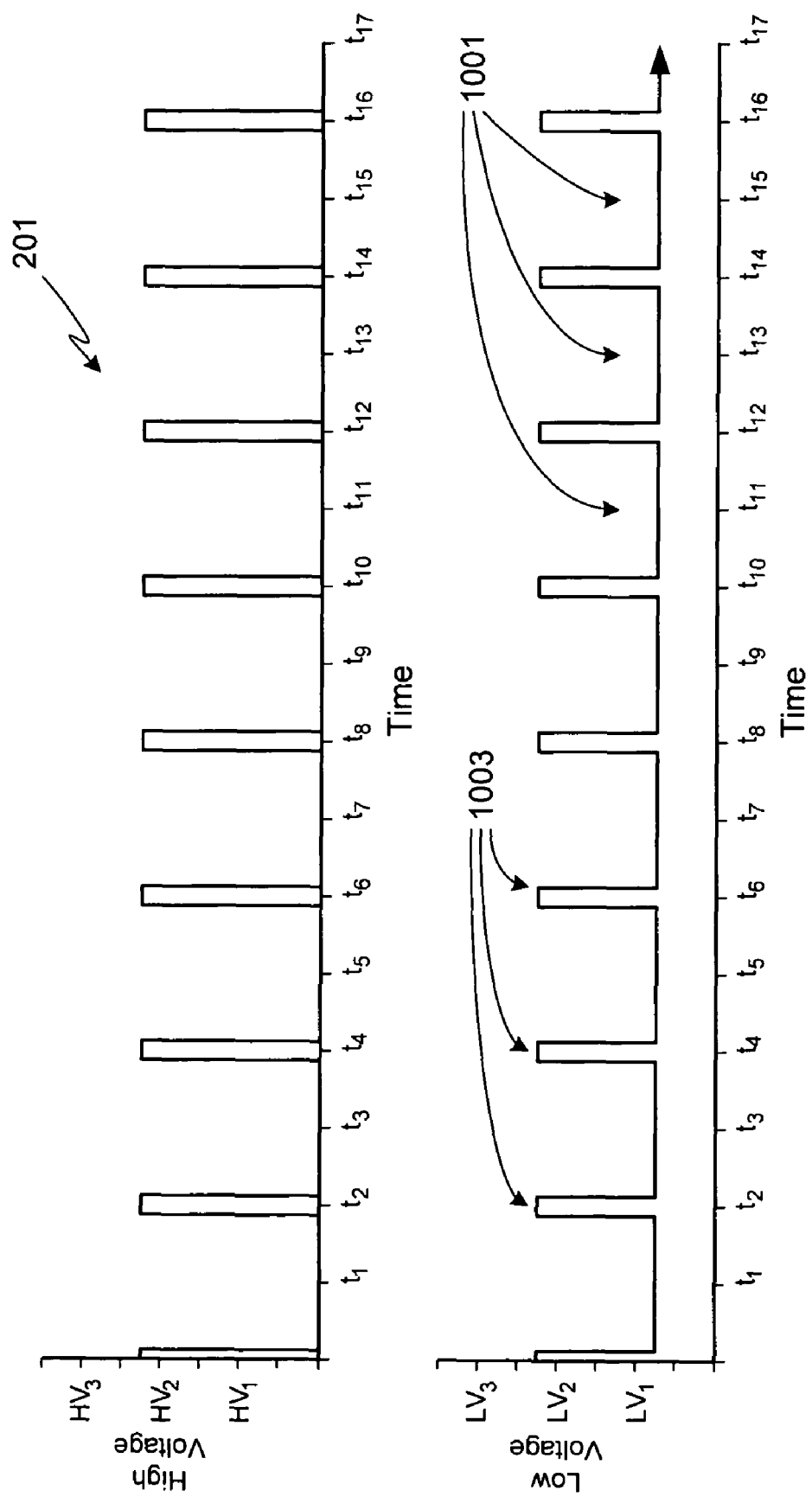
FIG. 10 is a graphical illustration of the pulse regimens applied to the low and high voltage electrodes in a preferred embodiment of the invention in which the pulsed low voltage applied to the low voltage electrodes never drops to zero.

In another variation of the pulse protocol, the voltage applied to the low voltage electrodes never falls to zero during operation of the electrolysis system. Accordingly, in one application of this protocol low voltage is continuously applied to the low voltage electrodes (e.g., graph 901 of FIG. 9) while pulsing the high voltage electrodes (e.g., high voltage pulses 201 of FIG. 9). In an alternate application of this protocol illustrated in FIG. 10, the applied low voltage is pulsed (e.g., low voltage pulses 1001 and 1003) in a manner similar to that shown in FIG. 8, except that the voltage does not drop to zero between successive low voltage pulses.

Figure 11:
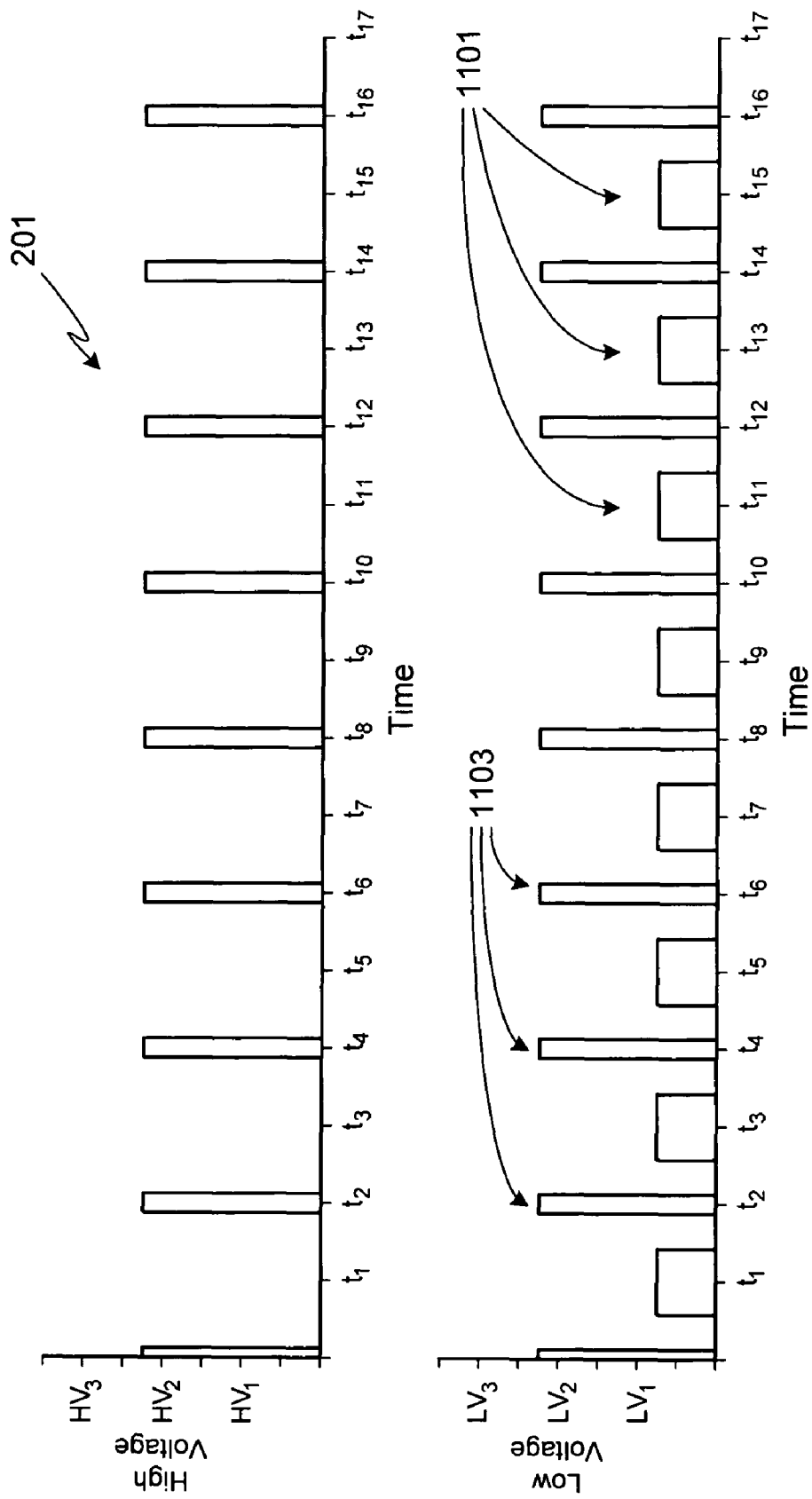
FIG. 11 is a graphical illustration of the pulse regimens applied to the low and high voltage electrodes in a preferred embodiment of the invention in which the secondary low voltage pulses comprise only a portion of the cycle between the primary low voltage pulses.
Figure 12:
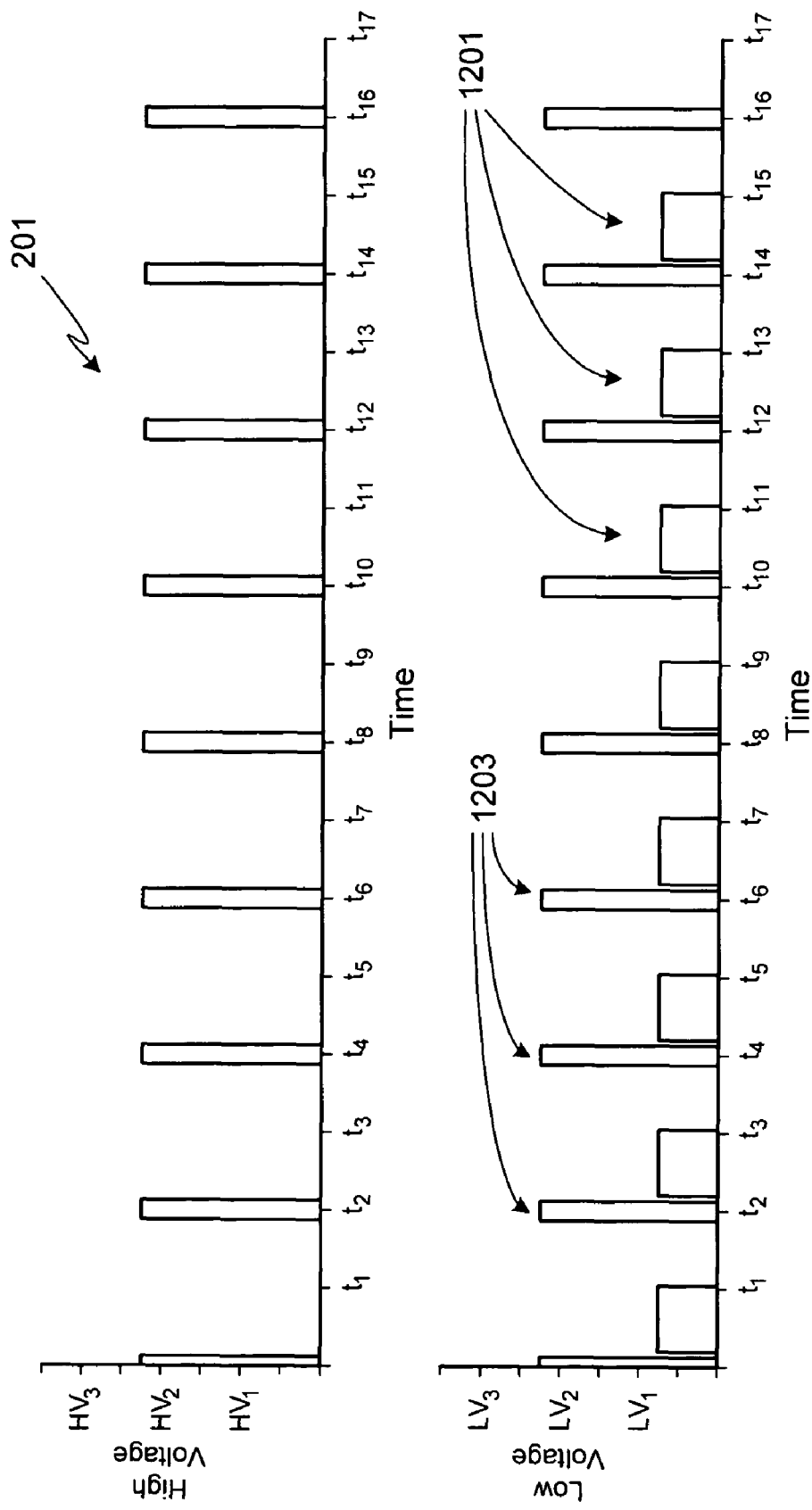
FIG. 12 is a graphical illustration of the pulse regimens applied to the low and high voltage electrodes in a preferred embodiment of the invention in which the secondary low voltage pulses comprise only a portion of the cycle between the primary low voltage pulses and in which the secondary low voltage pulses are offset.

In another variation of the pulse protocol, the gap between primary and secondary low voltage pulses is much larger than required for pulse rise and fall times. More specifically, the secondary pulse does not fill, or substantially fill, the portion of the cycle between the low voltage primary pulses. Preferably the secondary pulses fill at least 25 percent, more preferably at least 50 percent, still more preferably at least 75 percent, and yet still more preferably 100 percent of the portion of each cycle between primary pulses. FIG. 11 illustrates such a protocol in which the secondary pulses 1101 comprise approximately 50 percent of the cycle between primary low voltage pulses 1103. It should further be appreciated that in such a protocol the secondary pulses do not have to be centered between primary pulses. For example, and as illustrated in FIG. 12, secondary pulses 1201 are not centered between primary low voltage pulses 1203, rather they are offset. The offset can occur in either direction, although preferably they are offset in the direction illustrated in FIG. 12.

As previously noted, the electrolysis process of the invention generates considerable heat. It will be appreciated that if the system is allowed to become too hot for a given pressure, the liquid within the tank will begin to boil. Additionally, various system components may be susceptible to heat damage. Although the system can be turned off and allowed to cool when the temperature exceeds a preset value, this is not a preferred approach due to the inherent inefficiency of stopping the process, allowing the system to cool, and then restarting the system. Accordingly in the preferred embodiments of the invention the system includes means to actively cool the system to within an acceptable temperature range. For example, in at least one preferred embodiment the cooling system does not allow the temperature to exceed 90° C. Although it will be appreciated that the invention is not limited to a specific type of cooling system or a specific implementation of the cooling system, in at least one embodiment the electrolysis tank is surrounded by a coolant conduit 133, portions of which are shown in FIGS. 1, 4-7, and 16-20. Within coolant conduit 133 is a heat transfer medium, for example water. Coolant conduit 133 can either surround a portion of the electrolysis tank as shown, or be contained within the electrolysis tank, or be integrated within the walls of the electrolysis tank. The coolant pump and refrigeration system is not shown in the figures as cooling systems are well known by those of skill in the art.

Figure 13:
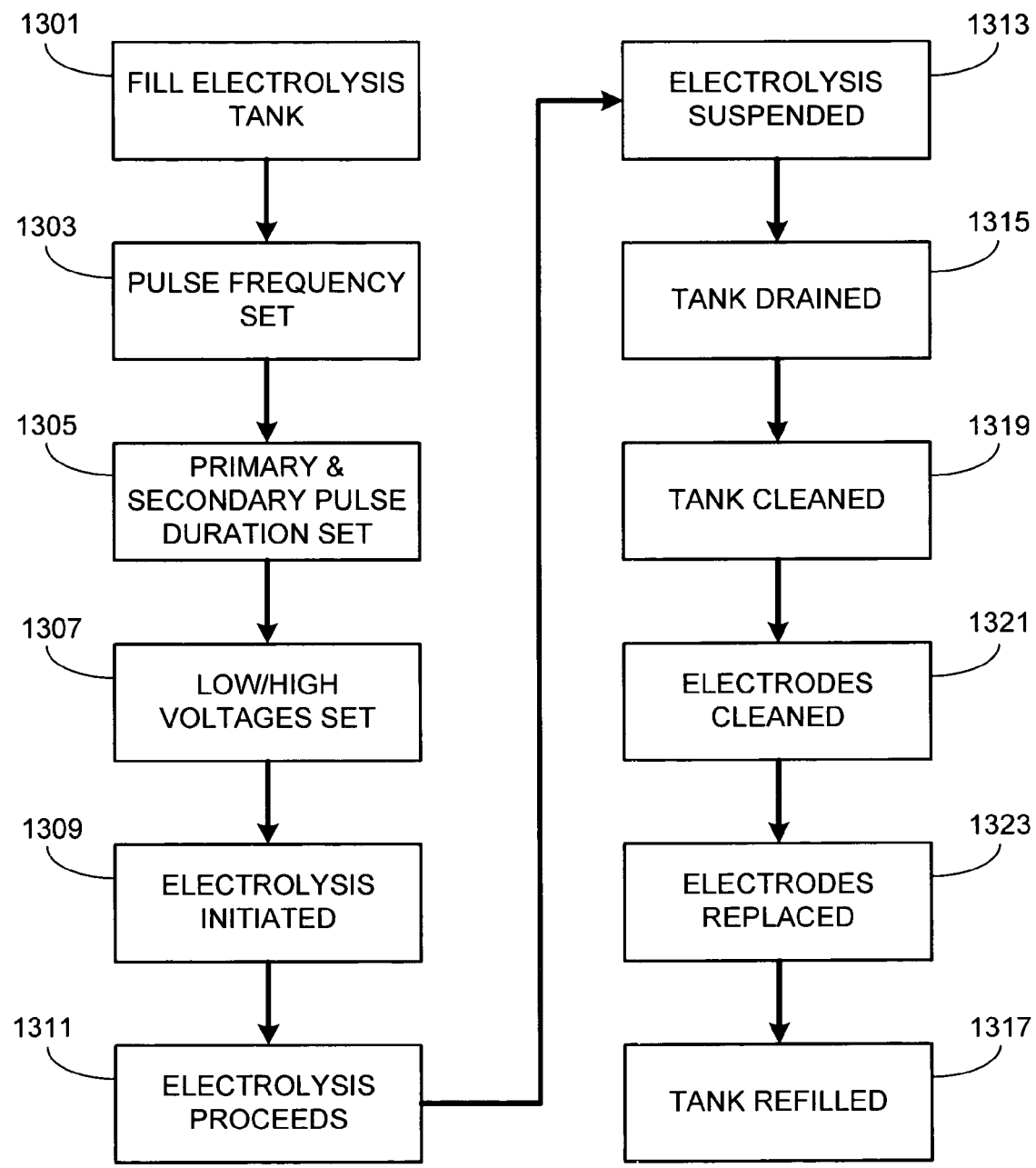
FIG. 13 is an illustration of one mode of operation.

It should be understood that the underlying electrolysis system of the present invention can be operated in a number of modes, the primary differences between modes being the degree of process optimization used during operation. For example, FIG. 13 illustrates one method of operation requiring minimal optimization. As illustrated, initially the electrolysis tank, e.g., tank 101, is filled with water (step 1301). The level of water in the tank preferably just covers the top of the electrodes although the process can also be run with even more water filling the tank. The electrolyte can either be mixed into the water prior to filling the tank or after the tank is filled. The frequency of the pulse generator, or generators depending upon the configuration, is then set (step 1303) as well as the pulse duration of both the primary and secondary pulses (step 1305). The initial voltage settings for the low voltage power supply and the high voltage power supply are also set (step 1307). It will be appreciated that the order of set-up is clearly not critical to the electrolysis process. In the preferred approach, prior to the initiation of electrolysis the temperature of the water is at room temperature.

Once set-up is complete, electrolysis is initiated (step 1309). During the electrolysis process (step 1311), and as previously noted, the water is heated by the process itself. Eventually, when it is no longer desirable to produce hydrogen or after the rate of hydrogen production drops below a user preset level, the electrolysis process is suspended (step 1313). Typically prior to further operation the water is removed from the tank (step 1315) and the tank is refilled (step 1317). Prior to refilling the tank, a series of optional steps can be performed. For example, the tank can be washed out (optional step 1319) and the electrodes can be cleaned, for example to remove oxides, by washing the electrodes with diluted acids (optional step 1321). Spent, or used up, electrodes can also be replaced prior to refilling (optional step 1323). After cleaning the system and/or replacing electrodes as deemed necessary, and refilling the system, the system is ready to reinitiate the electrolysis process.

The above sequence of processing steps works best once the operational parameters have been optimized for a specific system configuration since the system configuration will impact the efficiency of the process and therefore the hydrogen output. Exemplary system configuration parameters that affect the optimal electrolysis settings include tank size, quantity of water, type and/or quality of water, electrolyte composition, electrolyte concentration, electrode size, electrode composition, electrode shape, electrode configuration, electrode separation, initial water temperature, low voltage setting, high voltage setting, pulse frequency and pulse duration.

Figure 14:
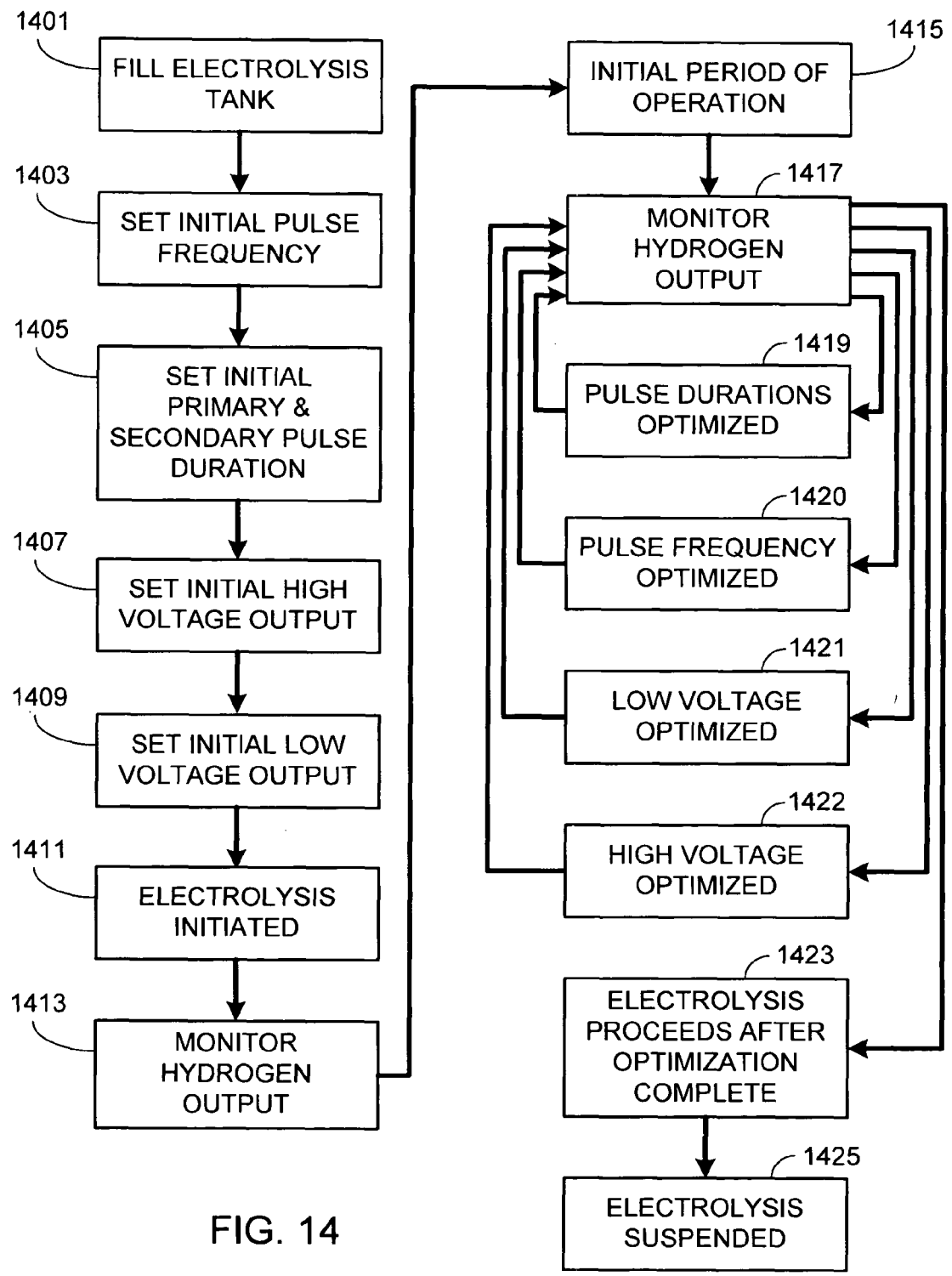
FIG. 14 is an illustration of an alternate mode of operation that includes initial process optimization steps.

FIG. 14 illustrates an alternate procedure, one in which the process undergoes optimization. Initially the tank is filled (step 1401) and initial settings for pulse frequency (step 1403), primary and secondary pulse duration (step 1405), high voltage supply output (step 1407) and low voltage supply output (step 1409) are made. Typically the initial settings are based on previous settings that have been optimized for a similarly configured system. For example, assuming that the new configuration was the same as a previous configuration except for the composition of the electrodes, a reasonable initial set-up would be the optimized set-up from the previous configuration.

After the initial set-up is completed, electrolysis is initiated (step 1411) and the hydrogen output flow rate is monitored (step 1413). Although system optimization can begin immediately, preferably the system is allowed to run for an initial period of time (step 1415) prior to optimization. The initial period of operation can be based on achieving a predetermined level of hydrogen flow, for example 5 liters per hour, or achieving a steady state hydrogen flow rate. Alternately the initial period of time can simply be a predetermined time period, for example 6 hours.

After the initial time period is exceeded, the hydrogen output is monitored (step 1417) while optimizing one or more of the operational parameters. Although the order of parameter optimization is not critical, in at least one preferred embodiment the first parameter to be optimized is primary and secondary pulse duration (step 1419). Then the pulse frequency is optimized (step 1420), followed by optimization of the low voltage for both the primary and secondary pulses (step 1421). Lastly, the output of the high voltage supply is optimized (step 1422). In this embodiment after optimization is complete, based on hydrogen output, the electrolysis process is allowed to continue (step 1423) without further optimization until the process is halted, step 1425, for example due to the rate of hydrogen production dropping below a user preset level. In another, and preferred, alternative approach illustrated in FIG. 15, one or more of optimization steps 1419-1422 are performed continuously throughout the electrolysis process until electrolysis is suspended.

Figure 6:
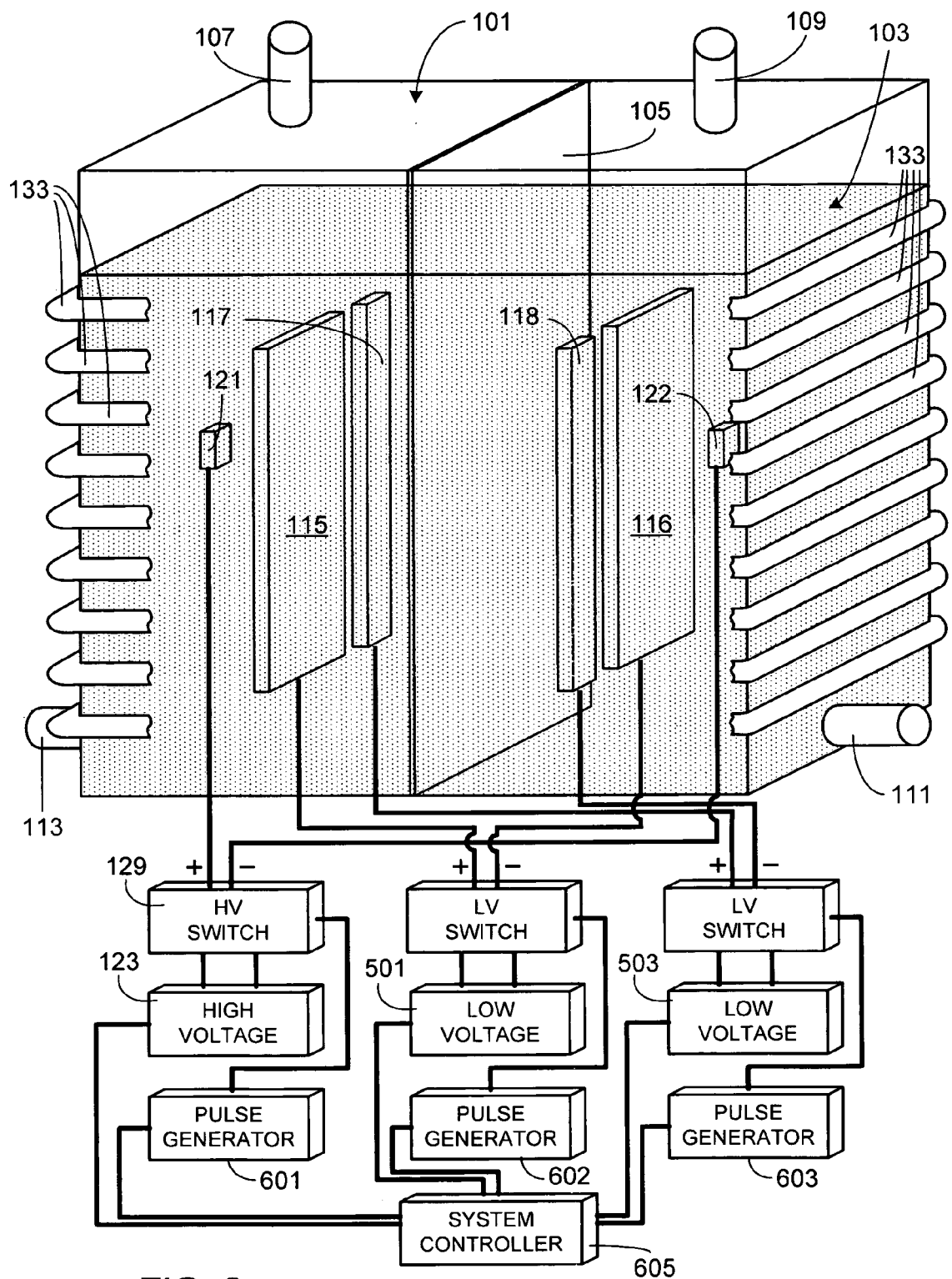
FIG. 6 is an illustration of an alternate embodiment utilizing multiple low voltage power supplies, multiple pulse generators and a system controller.
Figure 7:
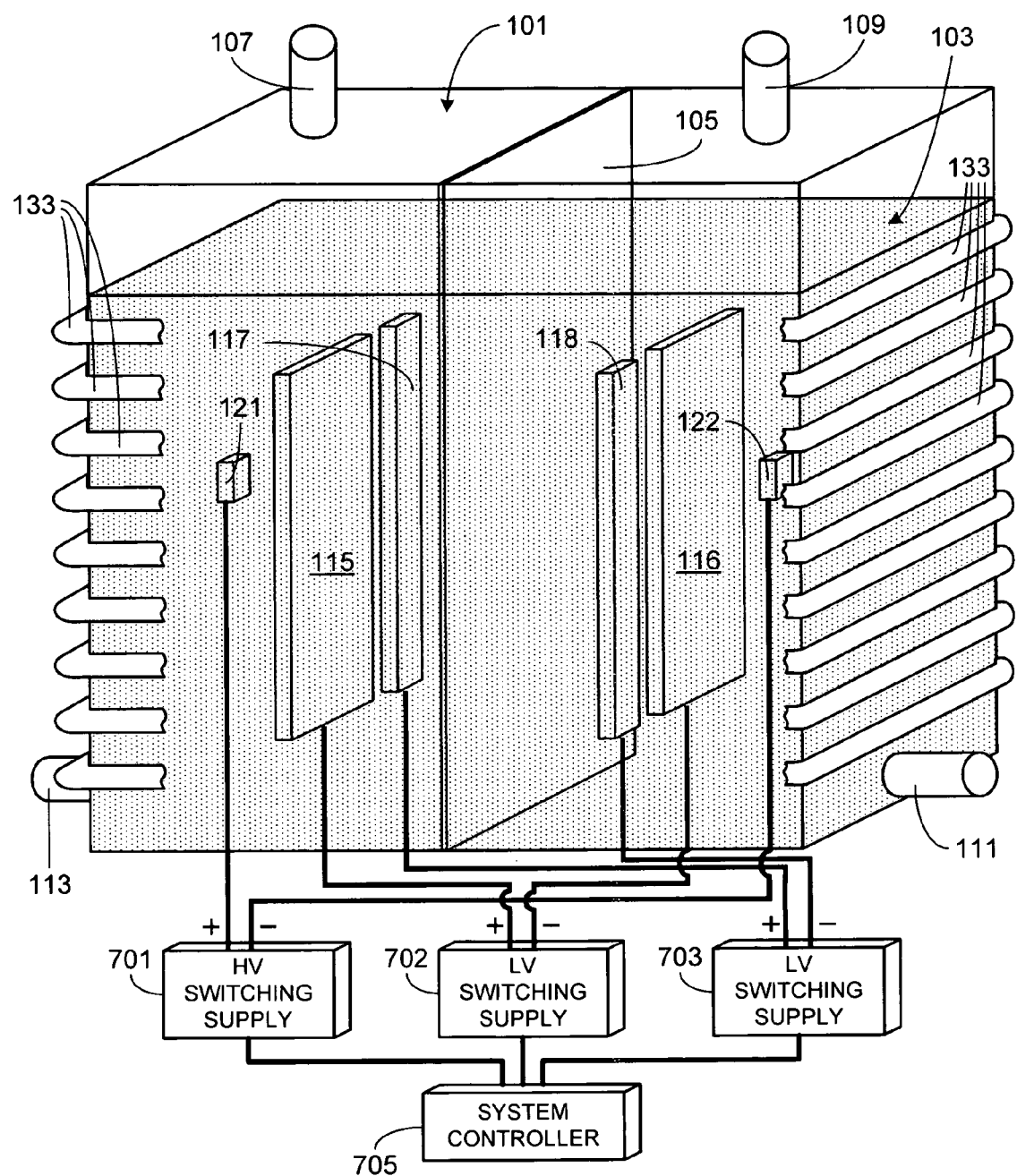
FIG. 7 is an illustration of an alternate embodiment utilizing multiple switching power supplies.
Figure 15:
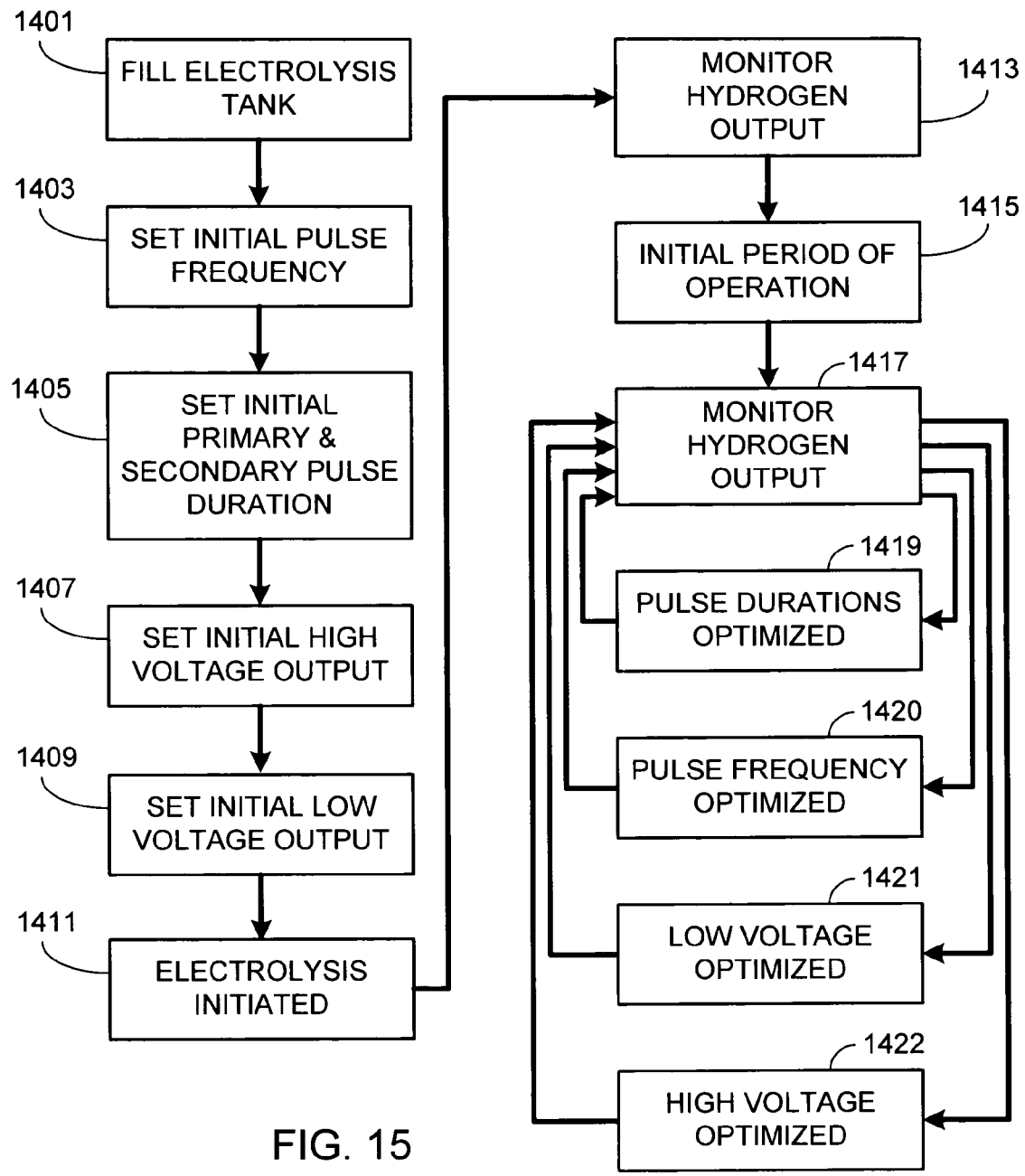
FIG. 15 is an illustration of an alternate, and preferred, mode of operation in which the process undergoes continuous optimization.

The optimization process described relative to FIGS. 14 and 15 can be performed manually. In the preferred embodiment, however, the system and the optimization of the system are controlled via a system controller, for example as illustrated in FIGS. 6 and 7. The system controller (e.g., controller 605 in FIG. 6 or controller 705 in FIG. 7) would also be coupled to a system monitor, for example a hydrogen flow rate monitor. As previously described, monitoring a system parameter such as hydrogen flow rate allows the system controller to optimize pulse frequency and duration (assuming the system controller is connected to the pulse generator) and the applied voltage (assuming the system controller is coupled to the voltage sources).

As will be appreciated by those of skill in the art, there are numerous minor variations of the systems described herein and shown in FIGS. 1 and 4-7 that will function in accordance with the invention. In particular and as previously noted, alternate configurations of the underlying electrolysis system can utilize differently sized/shaped tanks, various water/electrolyte solutions, any number of different electrode configurations and materials, a range of high voltage applied to the high voltage electrodes, and a range of low voltage applied to the low voltage electrodes during both the primary and secondary pulses. Additionally the invention can utilize a range of frequencies as well as a variety of different primary and secondary pulse widths. FIGS. 16-20 provide exemplary embodiments of a few of the possible variations of the underlying electrolysis system, these embodiments including non-coplanar low voltage electrodes (i.e., FIG. 16), multiple low voltage electrodes of one type and multiple high voltage electrodes (i.e., FIG. 17), a vertically configured cylindrical tank (i.e., FIG. 18), a horizontally configured cylindrical tank with a cross-wise membrane (i.e., FIG. 19), and a horizontally configured cylindrical tank with a length-wise membrane (i.e., FIG. 20). It should be understood that FIGS. 16-20 are only meant to illustrate a few of the possible variations on the electrolysis system as there are innumerable minor variations of the system that are clearly within the scope of the invention. Additionally it should be understood that the illustrated exemplary systems can utilize various drive electronics (i.e., power supplies, switches, pulse generators) in addition to that illustrated in FIG. 1, for example using the drive electronics illustrated in FIGS. 4-7.

Figure 16:
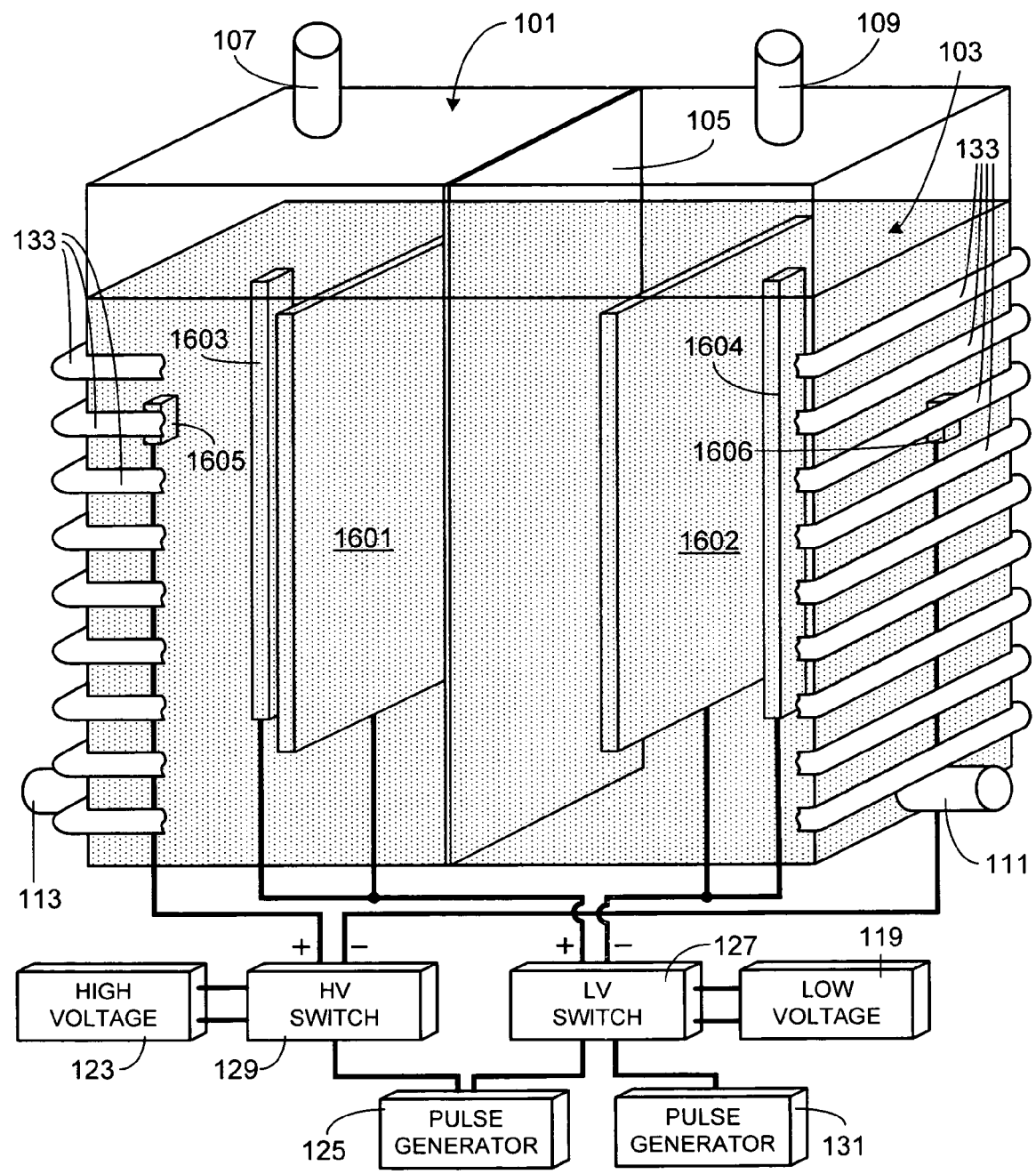
FIG. 16 is an illustration of an alternate embodiment of the underlying electrolysis system in which the separation distance between one type of low voltage electrode is greater than the separation distance between the second type of low voltage electrode.

FIG. 16 illustrates an alternate embodiment of the underlying electrolysis system shown in FIG. 1, the alternate embodiment configured such that the two types of low voltage electrodes are not coplanar. More specifically, electrodes 115/116 are replaced by electrodes 1601/1602, electrodes 117/118 are replaced by electrodes 1603/1604, and the distance separating electrodes 1601 and 1602 is smaller than the distance separating electrodes 1603 and 1604. As in the other embodiments, the high voltage electrodes (i.e., electrodes 1605/1606) are positioned outside the planes of the low voltage electrodes.

Figure 17:
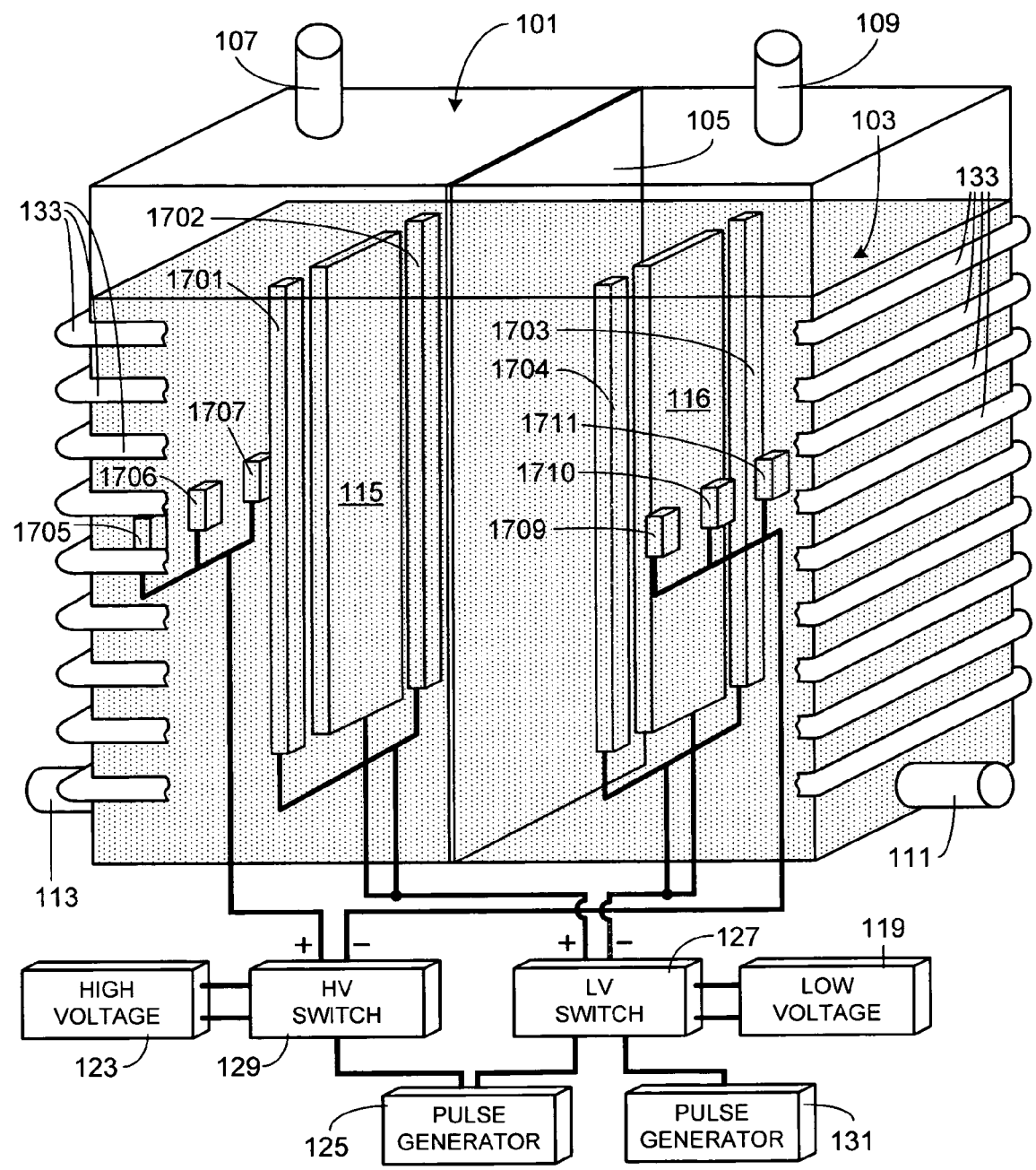
FIG. 17 is an illustration of an alternate embodiment of the underlying electrolysis system using multiple low voltage electrodes of one type and multiple high voltage electrodes.

FIG. 17 illustrates another alternate embodiment of the underlying electrolysis system shown in FIG. 1 in which low voltage electrode 117 is replaced by two low voltage electrodes 1701 and 1702, low voltage electrode 118 is replaced by two low voltage electrodes 1703 and 1704, high voltage electrode 121 is replaced by three high voltage electrodes 1705-1707, and high voltage electrode 122 is replaced by three high voltage electrodes 1709-1711.

In the previous exemplary embodiments, the illustrated electrodes are shown as being flat and arranged such that the flat electrodes faces are parallel to one another. The invention is not limited, however, to such electrode configurations. More specifically, some or all of the electrodes can utilize curved surfaces and/or be arranged in a non-parallel geometry. For example, in the embodiment illustrated in FIG. 18, all of the electrodes are cylindrically-shaped. Additionally this embodiment utilizes an alternate tank shape, specifically a vertically-positioned, cylindrically-shaped tank 1801. In this embodiment low voltage electrode 115 is replaced by three cylindrically-shaped, low voltage electrodes 1803-1805, low voltage electrode 116 is replaced by three cylindrically-shaped, low voltage electrodes 1807-1809, low voltage electrode 117 is replaced by cylindrically-shaped, low voltage electrode 1811, low voltage electrode 118 is replaced by cylindrically-shaped, low voltage electrode 1813, high voltage electrode 121 is replaced by cylindrically-shaped, high voltage electrode 1815, and high voltage electrode 122 is replaced by cylindrically-shaped, high voltage electrode 1817.

Figure 18:
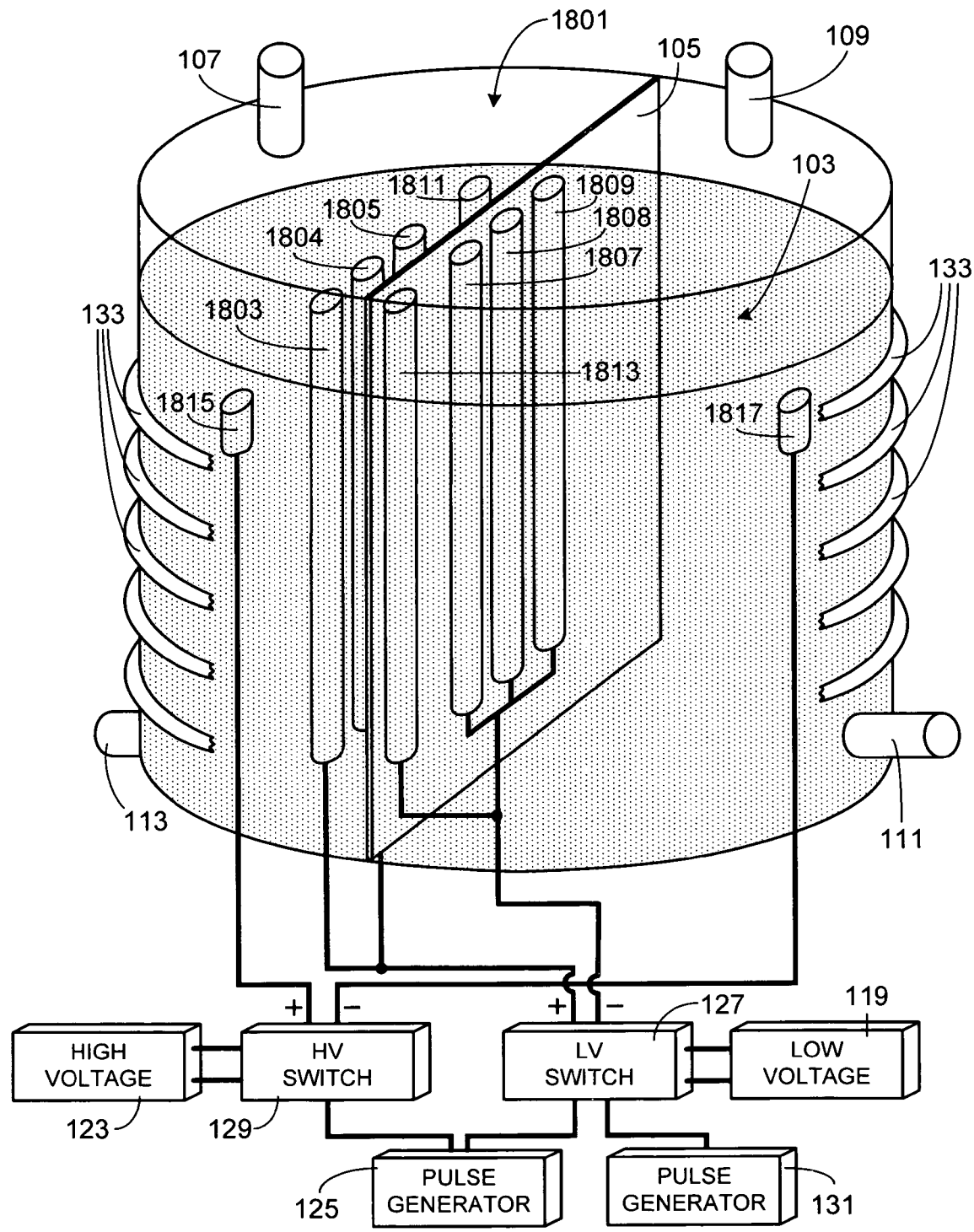
FIG. 18 is an illustration of an alternate embodiment utilizing a cylindrically-shaped tank.
Figure 19:
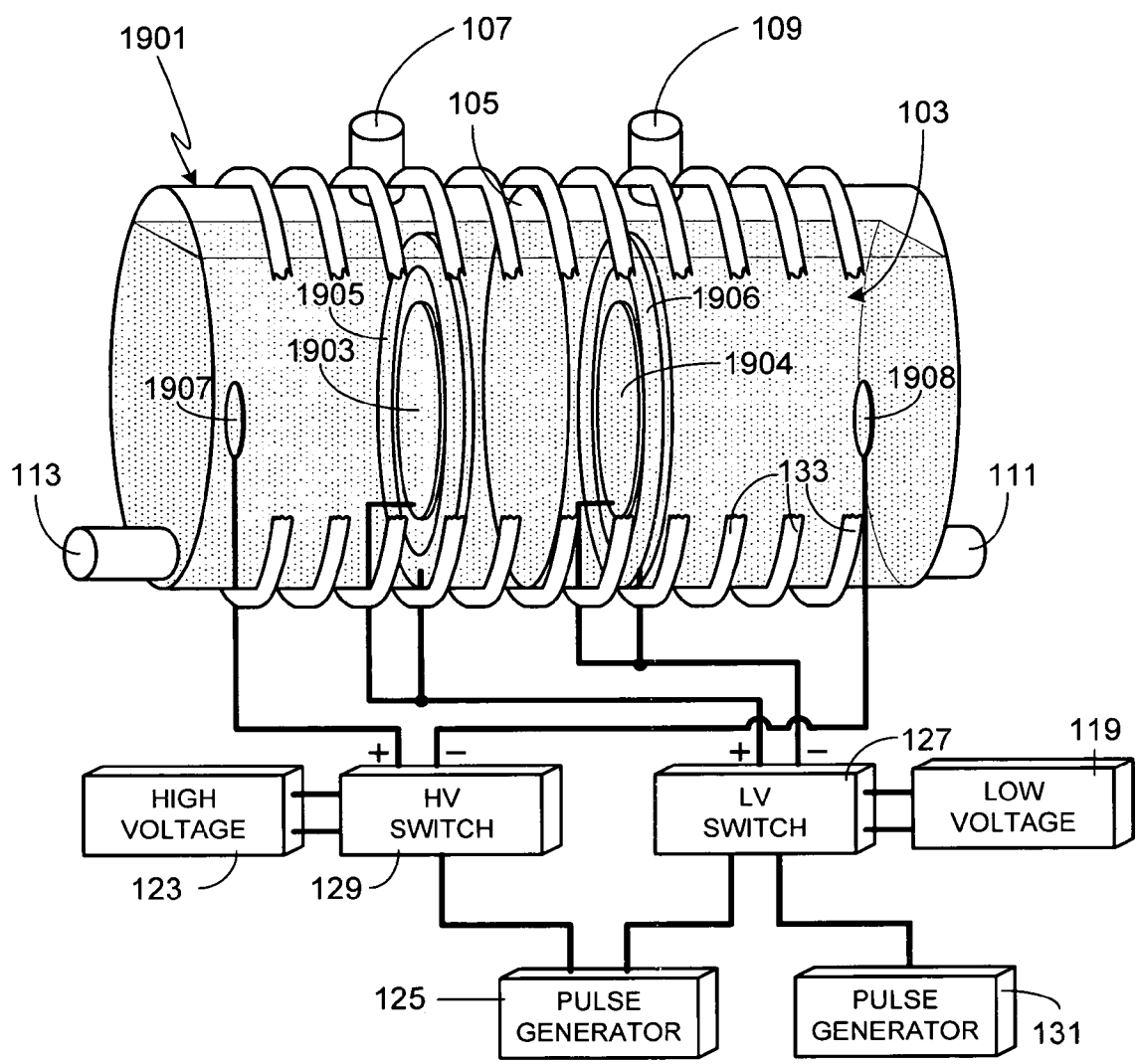
FIG. 19 is an illustration of an alternate embodiment utilizing a cylindrically-shaped tank with a different orientation than the tank of FIG. 18.

FIG. 19 illustrates another embodiment of the underlying electrolysis system shown in FIG. 1 utilizing a cylindrically-shaped tank 1901 similar to that shown in FIG. 18, except for the orientation of the tank. As in the embodiment illustrated in FIG. 1, this embodiment includes a single pair of electrodes of each type; disc-shaped electrodes 1903/1904 substituting for electrodes 115/116, ring-shaped electrodes 1905/1906 substituting for electrodes 117/118, and disc-shaped electrodes 1907/1908 substituting for electrodes 121/122. As previously noted with respect to the invention in general, this embodiment is not limited to specific electrode numbers, shapes, sizes or orientations.

Figure 20:
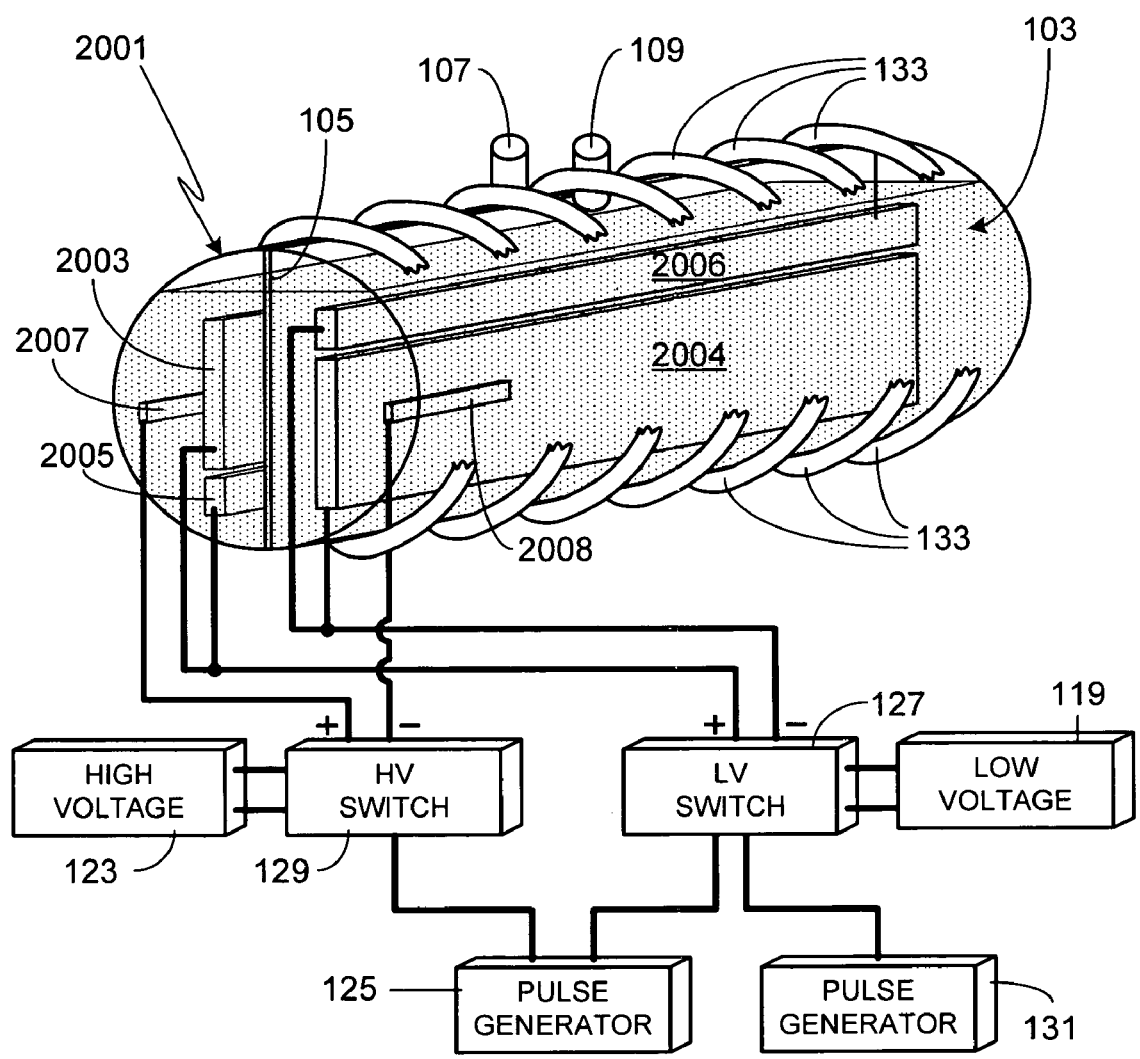
FIG. 20 is an illustration of an alternate embodiment utilizing a cylindrically-shaped tank with a different membrane orientation than that utilized in the tank shown in FIG. 19.

FIG. 20 illustrates another embodiment of the underlying electrolysis system shown in FIG. 1 utilizing a cylindrically-shaped tank 2001 similar to that shown in FIG. 19, except for the orientation of the membrane and electrodes. As in the embodiment illustrated in FIG. 1, this embodiment includes a single pair of electrodes of each type; electrodes 2003/2004 substituting for electrodes 115/116, electrodes 2005/2006 substituting for electrodes 117/118, and electrodes 2007/2008 substituting for electrodes 121/122. It should be noted that typically electrodes 2007/2008 are centered length-wise within tank 2001; however, the electrodes are shown non-centered in FIG. 20 so that they are visible in this view, i.e., so that electrode 2007 is not completely hidden from view by electrode 2003 and membrane 105.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An electrolysis system comprising:
an electrolysis tank;
a membrane separating said electrolysis tank into a first region and a second region, wherein said membrane restricts hydrogen gas flow and oxygen gas flow between said first and second regions;
at least one pair of low voltage electrodes of a first type contained within said electrolysis tank, said at least one pair of low voltage electrodes of said first type comprised of a first material and comprised of a low voltage anode of said first type and a low voltage cathode of said first type;
at least one pair of low voltage electrodes of a second type contained within said electrolysis tank, said at least one pair of low voltage electrodes of said second type comprised of a second material, wherein said first and second materials are different, and comprised of a low voltage anode of said second type and a low voltage cathode of said second type;
at least one pair of high voltage electrodes contained within said electrolysis tank and comprised of a high voltage anode and a high voltage cathode, wherein said anodes of said first and second types of low voltage electrodes and said anodes of said high voltage electrodes are contained within said first region and said cathodes of said first and second types of low voltage electrodes and said cathodes of said high voltage electrodes are contained within said second region, wherein a first separation distance corresponding to the distance between the high voltage electrodes of said at least one pair of high voltage electrodes is greater than a second separation distance corresponding to the distance between the low voltage electrodes of said at least one pair of low voltage electrodes of said first type, and wherein said first separation distance is greater than a third separation distance corresponding to the distance between the low voltage electrodes of said at least one pair of low voltage electrodes of said second type;
a low voltage source with a first output voltage and a second output voltage electrically connected to said at least one pair of low voltage electrodes of said first type and to said at least one pair of low voltage electrodes of said second type;
a high voltage source with a third output voltage electrically connected to said at least one pair of high voltage electrodes, wherein said third output voltage is higher than said first and second output voltages;
means for simultaneously pulsing both said low voltage source and said high voltage source with a primary pulse, said primary pulse having a specific frequency and a primary pulse duration, and wherein said low voltage source outputs said first output voltage during said primary pulse; and
means for pulsing said low voltage source with a secondary pulse offset from said primary pulse, said secondary pulse having said specific frequency and a secondary pulse duration, and wherein said low voltage source outputs said second output voltage during said secondary pulse.

2. The electrolysis system of claim 1, further comprising a liquid within said electrolysis tank, wherein said liquid includes at least one of water, deuterated water, tritiated water, semiheavy water, heavy oxygen water, water containing an isotope of hydrogen, or water containing an isotope of oxygen.

3. The electrolysis system of claim 2, further comprising an electrolyte within said liquid, said electrolyte having a concentration within said liquid of between 0.05 and 10.0 percent by weight.

4. The electrolysis system of claim 1, further comprising means for cooling said electrolysis system, wherein said cooling means is comprised of a conduit containing a heat transfer medium, wherein a portion of said conduit is in thermal communication with at least a portion of said electrolysis tank.

5. The electrolysis system of claim 1, wherein said first material is selected from the group consisting of steel, nickel, copper, iron, stainless steel, cobalt, manganese, zinc, titanium, platinum, palladium, aluminum, lithium, magnesium, boron, carbon, graphite, carbon-graphite, metal hydrides and alloys of steel, nickel, copper, iron, stainless steel, cobalt, manganese, zinc, titanium, platinum, palladium, aluminum, lithium, magnesium, boron, carbon, graphite; carbon-graphite and metal hydrides, wherein said second material is selected from the group consisting of steel, nickel, copper, iron, stainless steel, cobalt, manganese, zinc, titanium, platinum, palladium, aluminum, lithium, magnesium, boron, carbon, graphite, carbon-graphite, metal hydrides and alloys of steel, nickel, copper, iron, stainless steel, cobalt, manganese, zinc, titanium, platinum, palladium, aluminum, lithium, magnesium, boron, carbon, graphite, carbon-graphite and metal hydrides, and wherein each high voltage electrode is comprised of a third material selected from the group consisting of steel, nickel, copper, iron, stainless steel, cobalt, manganese, zinc, titanium, platinum, palladium, aluminum, lithium, magnesium, boron, carbon, graphite, carbon-graphite, metal hydrides and alloys of steel, nickel, copper, iron, stainless steel, cobalt, manganese, zinc, titanium, platinum, palladium, aluminum, lithium, magnesium, boron, carbon, graphite, carbon-graphite and metal hydrides.

6. An electrolysis system comprising:
an electrolysis tank;

a membrane separating said electrolysis tank into a first region and a second region, wherein said membrane restricts hydrogen gas flow and oxygen gas flow between said first and second regions;

at least one pair of low voltage electrodes of a first type contained within said electrolysis tank, said at least one pair of low voltage electrodes of said first type comprised of a first material and comprised of a low voltage anode of said first type and a low voltage cathode of said first type;

at least one pair of low voltage electrodes of a second type contained within said electrolysis tank, said at least one pair of low voltage electrodes of said second type comprised of a second material, wherein said first and second materials are different, and comprised of a low voltage anode of said second type and a low voltage cathode of said second type;

at least one pair of high voltage electrodes contained within said electrolysis tank and comprised of a high voltage anode and a high voltage cathode, wherein said anodes of said first and second types of low voltage electrodes and said anodes of said high voltage electrodes are contained within said first region and said cathodes of said first and second types of low voltage electrodes and said cathodes of said high voltage electrodes are contained within said second region, wherein a first separation distance corresponding to the distance between the high voltage electrodes of said at least one pair of high voltage electrodes is greater than a second separation distance corresponding to the distance between the low voltage electrodes of said at least one pair of low voltage electrodes of said first type, and wherein said first separation distance is greater than a third separation distance corresponding to the distance between the low voltage electrodes of said at least one pair of low voltage electrodes of said second type;

a low voltage source with a first output voltage electrically connected to said at least one pair of low voltage electrodes of said first type and to said at least one pair of low voltage electrodes of said second type;

a high voltage source with a second output voltage electrically connected to said at least one pair of high voltage electrodes, wherein said second output voltage is higher than said first output voltage; and means for pulsing said high voltage source at a specific frequency and with a specific pulse duration.

7. The electrolysis system of claim 6, further comprising a liquid within said electrolysis tank, wherein said liquid includes at least one of water, deuterated water, tritiated water, semiheavy water, heavy oxygen water, water containing an isotope of hydrogen, or water containing an isotope of oxygen.

8. The electrolysis system of claim 7, further comprising an electrolyte within said liquid, said electrolyte having a concentration within said liquid of between 0.05 and 10.0 percent by weight.

9. The electrolysis system of claim 6, further comprising means for cooling said electrolysis system, wherein said cooling means is comprised of a conduit containing a heat transfer medium, wherein a portion of said conduit is in thermal communication with at least a portion of said electrolysis tank.

10. The electrolysis system of claim 6, wherein said first material is selected from the group consisting of steel, nickel, copper, iron, stainless steel, cobalt, manganese, zinc, titanium, platinum, palladium, aluminum, lithium, magnesium, boron, carbon, graphite, carbon-graphite, metal hydrides and alloys of steel, nickel, copper, iron, stainless steel, cobalt, manganese, zinc, titanium, platinum, palladium, aluminum, lithium, magnesium, boron, carbon, graphite, carbon-graphite and metal hydrides, wherein said second material is selected from the group consisting of steel, nickel, copper, iron, stainless steel, cobalt, manganese, zinc, titanium, platinum, palladium, aluminum, lithium, magnesium, boron, carbon, graphite, carbon-graphite, metal hydrides and alloys of steel, nickel, copper, iron, stainless steel, cobalt, manganese, zinc, titanium, platinum, palladium, aluminum, lithium, magnesium, boron, carbon, graphite, carbon-graphite and metal hydrides, and wherein each high voltage electrode is comprised of a third material selected from the group consisting of steel, nickel, copper, iron, stainless steel, cobalt, manganese, zinc, titanium, platinum, palladium, aluminum, lithium, magnesium, boron, carbon, graphite, carbon-graphite, metal hydrides and alloys of steel, nickel, copper, iron, stainless steel, cobalt, manganese, zinc, titanium, platinum, palladium, aluminum, lithium, magnesium, boron, carbon, graphite, carbon-graphite and metal hydrides.

11. A method of operating an electrolysis system comprising the steps of:

filling an electrolysis tank with liquid;

applying a plurality of primary low voltage pulses at a specific frequency to at least one pair of low voltage electrodes of a first type within said electrolysis tank and at least one pair of low voltage electrodes of a second type within said electrolysis tank, wherein each of said plurality of primary low voltage pulses is of a first duration;

applying a plurality of primary high voltage pulses at said specific frequency to at least one pair of high voltage electrodes within said electrolysis tank, wherein each of said plurality of primary high voltage pulses is of said first duration, said primary high voltage pulse applying step further comprising the step of timing said primary high voltage pulse applying step to coincide with said primary low voltage pulse applying step; and applying a plurality of secondary low voltage pulses at said specific frequency to said at least one pair of low voltage electrodes of said first type and to said at least one pair of low voltage electrodes of said second type, wherein each of said plurality of secondary low voltage pulses is of a second duration, said secondary low voltage pulse applying step further comprising the step of offsetting said secondary low voltage pulse applying step from said primary low voltage pulse applying step.

12. The method of claim 11, further comprising the steps of:

decreasing power applied to said at least one pair of low voltage electrodes of said first type to zero between said primary low voltage pulse applying step and said secondary low voltage pulse applying step; and decreasing power applied to said at least one pair of low voltage electrodes of said second type to zero between said primary low voltage pulse applying step and said secondary low voltage pulse applying step.

13. The method of claim 11, wherein said at least one pair of low voltage electrodes of said first type is comprised of at least one low voltage anode electrode of said first type and at least one low voltage cathode electrode of said first type, wherein said at least one pair of low voltage electrodes of said second type is comprised of at least one low voltage anode electrode of said second type and at least one low voltage cathode electrode of said second type, wherein said at least one pair of high voltage electrodes is comprised of at least one high voltage anode electrode and at least one high voltage cathode electrode, the method further comprising the steps of positioning each low voltage cathode electrode of said first type within a first region of said electrolysis tank and each low voltage anode electrode of said first type within a second region of said electrolysis tank, positioning each low voltage cathode electrode of said second type within said first region of said electrolysis tank and each low voltage anode electrode of said second type within said second region of said electrolysis tank, and positioning each high voltage cathode electrode within said first region of said electrolysis tank and each high voltage anode electrode within said second region of said electrolysis tank, the method further comprising the step of positioning a membrane within said electrolysis tank, said membrane separating said electrolysis tank into said first region and said second region.

14. The method of claim 11, further comprising the step of selecting said liquid from the group consisting of water, deuterated water, tritiated water, semiheavy water, heavy oxygen water, water containing an isotope of hydrogen, or water containing an isotope of oxygen.

15. The method of claim 11, further comprising the step of adding an electrolyte to said liquid.

16. The method of claim 11, wherein:
said at least one pair of low voltage electrodes of said first type,
said at least one pair of low voltage electrodes of said second type, and
said at least one pair of high voltage electrodes
are each fabricated from the group consisting of steel, nickel, copper, iron, stainless steel, cobalt, manganese, zinc, titanium, platinum, palladium, aluminum, lithium, magnesium, boron, carbon, graphite, carbon-graphite, metal hydrides and alloys of steel, nickel, copper, iron, stainless steel, cobalt, manganese, zinc, titanium, platinum, palladium, aluminum, lithium, magnesium, boron, carbon, graphite, carbon-graphite and metal hydrides.

17. A method of operating an electrolysis system comprising the steps of:
filling an electrolysis tank with liquid;
applying a low voltage to at least one pair of low voltage electrodes of a first type within said electrolysis tank and at least one pair of low voltage electrodes of a second type within said electrolysis tank; and
applying a plurality of primary high voltage pulses at a specific frequency to at least one pair of high voltage electrodes within said electrolysis tank, wherein each of said plurality of primary high voltage pulses is of a specific duration.

18. The method of claim 17, further comprising the step of applying a plurality of low voltage pulses at said specific frequency and with said specific duration to said at least one pair of low voltage electrodes of said first type and to said at least one pair of low voltage electrodes of said second type, wherein a first low voltage applied during said step of applying said plurality of low voltage pulses is different than a second low voltage applied during said low voltage applying step.

19. The method of claim 17, wherein said at least one pair of low voltage electrodes of said first type is comprised of at least one low voltage anode electrode of said first type and at least one low voltage cathode electrode of said first type, wherein said at least one pair of low voltage electrodes of said second type is comprised of at least one low voltage anode electrode of said second type and at least one low voltage cathode electrode of said second type, wherein said at least one pair of high voltage electrodes is comprised of at least one high voltage anode electrode and at least one high voltage cathode electrode, the method further comprising the steps of positioning each low voltage cathode electrode of said first type within a first region of said electrolysis tank and each low voltage anode electrode of said first type within a second region of said electrolysis tank, positioning each low voltage cathode electrode of said second type within said first region of said electrolysis tank and each low voltage anode electrode of said second type within said second region of said electrolysis tank, and positioning each high voltage cathode electrode within said first region of said electrolysis tank and each high voltage anode electrode within said second region of said electrolysis tank, the method further comprising the step of positioning a membrane within said electrolysis tank, said membrane separating said electrolysis tank into said first region and said second region.

20. The method of claim 17, further comprising the step of selecting said liquid from the group consisting of water, deuterated water, tritiated water, semiheavy water, heavy oxygen water, water containing an isotope of hydrogen, or water containing an isotope of oxygen.

21. The method of claim 17, further comprising the step of adding an electrolyte to said liquid.

22. The method of claim 17, wherein:
said at least one pair of low voltage electrodes of said first type,
said at least one pair of low voltage electrodes of said second type, and
said at least one pair of high voltage electrodes
are each fabricated from the group consisting of steel, nickel, copper, iron, stainless steel, cobalt, manganese, zinc, titanium, platinum, palladium, aluminum, lithium, magnesium, boron, carbon, graphite, carbon-graphite, metal hydrides and alloys of steel, nickel, copper, iron, stainless steel, cobalt, manganese, zinc, titanium, platinum, palladium, aluminum, lithium, magnesium, boron, carbon, graphite, carbon-graphite and metal hydrides.

* * * * *